(12) United States Patent
Vanko et al.

(10) Patent No.: US 11,047,528 B2
(45) Date of Patent: Jun. 29, 2021

(54) ELECTRONIC BRAKING FOR A POWER TOOL HAVING A BRUSHLESS MOTOR

(71) Applicant: Black & Decker Inc., New Britain, CT (US)

(72) Inventors: John C. Vanko, Tmonium, MD (US); Marcell E. Coates, Baltimore, MD (US); Daniel F. Nace, Towson, MD (US); Matthew J. Velderman, Baltimore, MD (US); Sean M. Kelly, York, PA (US); James E. Goble, Red Lion, PA (US)

(73) Assignee: Black & Decker Inc., New Britain, CT (US)

(*) Notice: Subject to any disclaimer, the term of this patent is extended or adjusted under 35 U.S.C. 154(b) by 733 days.

(21) Appl. No.: 15/429,821

(22) Filed: Feb. 10, 2017

(65) Prior Publication Data

US 2017/0234484 A1 Aug. 17, 2017

Related U.S. Application Data

(60) Provisional application No. 62/294,684, filed on Feb. 12, 2016.

(51) Int. Cl.
*F16P 7/02* (2006.01)
*B24B 23/02* (2006.01)
(Continued)

(52) U.S. Cl.
CPC .............. *F16P 7/02* (2013.01); *B24B 23/028* (2013.01); *B25F 5/001* (2013.01); *H02P 3/18* (2013.01);
(Continued)

(58) Field of Classification Search
CPC ......... H02K 7/145; B25B 23/147; B25F 5/00; B25F 5/001; H02P 23/20; H02P 6/30;
(Continued)

(56) References Cited

U.S. PATENT DOCUMENTS 3,548,276 A 2/1970 Gross
3,673,481 A 6/1972 Hardin
(Continued)

FOREIGN PATENT DOCUMENTS

DE 1 225 223 9/1966
DE 29 29 259 1/1981
(Continued)

OTHER PUBLICATIONS

Extended EP Search Reported dated Feb. 8, 2018 issued in corresponding EP application No. 17155606.1.
(Continued)

*Primary Examiner* — Thomas M Wittenschlaeger
*Assistant Examiner* — Scott A Howell
(74) *Attorney, Agent, or Firm* — Amir R. Rohani

(57) ABSTRACT

A power tool is provided including a housing, a brushless direct-current (BLDC) electric motor disposed inside the housing, power switches disposed between a power supply and the electric motor and including high-side switches and low-side switches, and a control unit configured to control a switching operation of the power switches to operate the electric motor and electronically brake the motor by simultaneously activating the high-side switches or the low-side switches to stop the rotation of the motor upon detection of a condition prompting the braking of the motor. The control unit is configured to detect the condition that prompts the braking of the electric motor, set a braking profile for
(Continued)

braking the electric motor based on the detected condition, and execute braking of the electric motor using the braking profile.

6 Claims, 20 Drawing Sheets

(51) Int. Cl.
| | |
|---|---|
| *H02P 29/024* | (2016.01) |
| *H02P 27/08* | (2006.01) |
| *H02P 6/24* | (2006.01) |
| *B25F 5/00* | (2006.01) |
| *H02K 7/14* | (2006.01) |
| *H02P 3/18* | (2006.01) |

(52) U.S. Cl.
CPC .............. *H02P 6/24* (2013.01); *H02P 27/08* (2013.01); *H02P 29/024* (2013.01); *H02P 29/0241* (2016.02); *H02K 7/145* (2013.01); *Y02P 70/10* (2015.11)

(58) Field of Classification Search
CPC .......... H02P 3/14; H02P 29/0241; H02P 3/18; H02P 6/24; H02P 27/08; H02P 29/024; F16P 7/02; B24B 23/028; Y02P 70/177
USPC .............................. 173/217; 318/400.09, 703
See application file for complete search history.

(56) References Cited

U.S. PATENT DOCUMENTS

| | | | |
|---|---|---|---|
| 3,708,734 A | 1/1973 | Rowe | |
| 3,742,507 A | 6/1973 | Pirre | |
| 3,815,002 A | 6/1974 | Clemente et al. | |
| 3,848,169 A | 11/1974 | Asano et al. | |
| 3,897,595 A | 6/1975 | Fearno | |
| 3,895,277 A | 7/1975 | Klumpp | |
| 3,965,404 A | 6/1976 | Petersen | |
| 4,088,933 A | 5/1978 | Hashimoto et al. | |
| 4,161,921 A | 6/1979 | Nishida et al. | |
| 4,176,306 A | 11/1979 | Asano et al. | |
| 4,216,417 A | 8/1980 | Anderson et al. | |
| 4,228,383 A | 10/1980 | Soeda et al. | |
| 4,249,117 A | 2/1981 | Leukhardt et al. | |
| 4,250,436 A | 2/1981 | Weissman | |
| 4,284,936 A | 8/1981 | Bailey | |
| 4,311,948 A | 1/1982 | Brown et al. | |
| 4,431,956 A | 2/1984 | Angquist | |
| 4,450,397 A | 5/1984 | Painter et al. | |
| 4,462,642 A | 7/1984 | Leiber | |
| 4,498,033 A | 2/1985 | Aihara et al. | |
| 4,644,201 A | 2/1987 | Tani et al. | |
| 4,663,575 A | 8/1987 | Luzswik et al. | |
| 4,705,997 A | 11/1987 | Luzswik | |
| 4,718,013 A | 1/1988 | Kubo | |
| 4,725,764 A | 2/1988 | Prestel | |
| 4,751,414 A | 6/1988 | Davis et al. | |
| 4,783,995 A | 11/1988 | Michel et al. | |
| 4,862,052 A | 8/1989 | Unsworth et al. | |
| 4,916,370 A | 4/1990 | Rowan et al. | |
| 4,937,509 A | 6/1990 | Gundlach | |
| 4,978,897 A | 12/1990 | Merrison et al. | |
| 5,063,319 A | 11/1991 | Mason et al. | |
| 5,180,023 A | 1/1993 | Reimers | |
| 5,246,276 A | 9/1993 | Pajonk et al. | |
| 5,294,874 A | 3/1994 | Hessenberger et al. | |
| 5,424,622 A | 6/1995 | Keller et al. | |
| 5,462,342 A | 10/1995 | Goebels | |
| 5,485,064 A | 1/1996 | Arnaud et al. | |
| 5,485,066 A | 1/1996 | Zeigler | |
| 5,514,050 A | 5/1996 | Bauerle et al. | |
| 5,517,093 A | 5/1996 | Augustyniak et al. | |
| 5,552,686 A | 11/1996 | Schmid et al. | |
| 5,572,916 A | 11/1996 | Takano | |
| 5,608,301 A * | 3/1997 | Inaniwa | H02M 5/4585 318/376 |
| 5,635,804 A | 6/1997 | Tanaka et al. | |
| 5,644,112 A | 7/1997 | Geiger et al. | |
| 5,644,202 A | 7/1997 | Toriyama et al. | |
| 5,669,678 A | 9/1997 | Stumpe et al. | |
| 5,703,456 A | 12/1997 | Cox | |
| 5,708,333 A | 1/1998 | Im | |
| 5,752,748 A | 5/1998 | Schramm et al. | |
| 5,760,553 A | 6/1998 | Astic et al. | |
| 5,764,009 A | 6/1998 | Fukaya et al. | |
| 5,789,885 A | 8/1998 | Seel | |
| 5,791,057 A | 8/1998 | Nakamura et al. | |
| 5,828,194 A | 10/1998 | Canova | |
| 5,853,229 A | 12/1998 | Willmann et al. | |
| 5,861,724 A | 1/1999 | Ackerson | |
| 5,864,285 A | 1/1999 | Wieder et al. | |
| 5,952,799 A | 9/1999 | Maisch et al. | |
| 6,005,489 A | 12/1999 | Siegle et al. | |
| 6,008,604 A | 12/1999 | Maisch | |
| 6,012,556 A | 1/2000 | Blosch et al. | |
| 6,013,993 A | 1/2000 | Barbisch | |
| 6,037,729 A | 3/2000 | Woods et al. | |
| 6,045,076 A | 4/2000 | Daniels | |
| 6,051,952 A | 4/2000 | Moreira et al. | |
| 6,087,815 A | 7/2000 | Pfeifer et al. | |
| 6,092,876 A | 7/2000 | Komhaas et al. | |
| 6,094,025 A | 7/2000 | Rosa | |
| 6,104,155 A | 8/2000 | Rosa | |
| 6,126,250 A | 10/2000 | Gutoehrlein et al. | |
| 6,147,498 A | 11/2000 | Sumiya et al. | |
| 6,173,820 B1 | 1/2001 | Blosch et al. | |
| 6,202,018 B1 | 3/2001 | Stumpe et al. | |
| 6,204,627 B1 * | 3/2001 | Watanabe | B04B 9/10 318/729 |
| 6,206,488 B1 | 3/2001 | Binder et al. | |
| 6,208,096 B1 | 4/2001 | Mahr et al. | |
| 6,236,177 B1 * | 5/2001 | Zick | B23D 59/001 318/362 |
| 6,274,993 B1 | 8/2001 | Itabashi et al. | |
| 6,291,955 B1 | 9/2001 | Itabashi et al. | |
| 6,302,501 B1 | 10/2001 | Dominke et al. | |
| 6,329,777 B1 | 12/2001 | Itabashi et al. | |
| 6,353,297 B1 | 3/2002 | Meyer | |
| 6,448,727 B1 | 9/2002 | Rotterhusen | |
| 6,573,681 B2 | 6/2003 | Schwesig | |
| 6,803,736 B1 | 10/2004 | Hommel et al. | |
| 6,917,169 B2 | 6/2005 | Nagasawa et al. | |
| 6,943,510 B2 | 9/2005 | Gorti | |
| 6,998,804 B2 | 2/2006 | Meyer et al. | |
| 7,023,159 B2 | 4/2006 | Gorit et al. | |
| 7,071,645 B2 | 6/2006 | Hahn et al. | |
| 7,075,257 B2 | 7/2006 | Carrier et al. | |
| 7,084,594 B2 | 8/2006 | Itabashi et al. | |
| 7,270,591 B2 | 9/2007 | Deshopande et al. | |
| 7,285,877 B2 | 10/2007 | Gorti et al. | |
| 7,318,768 B2 | 1/2008 | Deshpande et al. | |
| 7,414,425 B2 | 8/2008 | O'Gorman et al. | |
| 7,439,714 B2 | 10/2008 | Gonzalez et al. | |
| 7,496,460 B2 | 2/2009 | Hornick et al. | |
| 7,498,762 B2 | 3/2009 | Takada | |
| 7,545,052 B2 | 6/2009 | Gonzalez et al. | |
| 7,580,803 B2 | 8/2009 | Hornick et al. | |
| 7,615,947 B2 | 11/2009 | Tamaoka | |
| 7,705,548 B2 | 4/2010 | Galbiati | |
| 8,093,844 B2 * | 1/2012 | Milesi | H02P 6/24 318/362 |
| 8,350,512 B2 | 1/2013 | Matsunaga et al. | |
| 10,177,691 B2 * | 1/2019 | Eshleman | B25F 5/00 |
| 2001/0040455 A1 | 11/2001 | Arlt et al. | |
| 2003/0006726 A1 | 1/2003 | Weiberle et al. | |
| 2004/0130282 A1 | 7/2004 | Meyer et al. | |
| 2005/0065695 A1 | 3/2005 | Grieser | |
| 2007/0287365 A1 | 12/2007 | Deshpande et al. | |
| 2007/0296462 A1 | 12/2007 | Hwang et al. | |
| 2009/0102404 A1 | 4/2009 | Burema et al. | |
| 2009/0265992 A1 | 10/2009 | Hass et al. | |
| 2009/0315491 A1 | 12/2009 | Karwath et al. | |

(56) References Cited

U.S. PATENT DOCUMENTS

| | | | |
|---|---|---|---|
| 2010/0123419 A1 | 5/2010 | Bonvin | |
| 2010/0148611 A1 | 6/2010 | Wang et al. | |
| 2011/0284256 A1 | 11/2011 | Iwata | |
| 2012/0013278 A1 | 1/2012 | Hanlon et al. | |
| 2012/0074881 A1* | 3/2012 | Pant | B25B 23/147 318/400.09 |
| 2012/0091932 A1 | 4/2012 | Rottmerhusen | |
| 2015/0137717 A1* | 5/2015 | Ishikawa | B25F 5/00 318/379 |
| 2015/0256111 A1 | 9/2015 | Forster et al. | |

FOREIGN PATENT DOCUMENTS

| | | |
|---|---|---|
| DE | 3312981 | 10/1984 |
| DE | 3539841 | 3/1987 |
| DE | 3614093 | 11/1987 |
| DE | 4200996 A1 | 7/1993 |
| DE | 43 42 285 | 6/1995 |
| DE | 4201005 C2 | 8/1995 |
| DE | 4429962 A1 | 2/1996 |
| DE | 19542603 C2 | 5/1996 |
| DE | 19651298 C2 | 6/1998 |
| DE | 19753554 | 7/1999 |
| DE | 4244805 C2 | 9/1999 |
| DE | 19809939 A1 | 9/1999 |
| DE | 102 02 603 | 8/2003 |
| DE | 102 44 208 | 4/2004 |
| DE | 103 02 515 | 8/2004 |
| DE | 10317636 A1 | 11/2004 |
| DE | 10 2007 029 719 | 8/2008 |
| DE | 10 2007 014 128 | 9/2008 |
| DE | 10 2008 010975 | 12/2008 |
| DE | 10 2007 036 315 | 2/2009 |
| DE | 102009031224 B3 | 9/2010 |
| DE | 102011110929 A1 | 1/2011 |
| DE | 102009060731 A1 | 6/2011 |
| EP | 0578366 A2 | 12/1973 |
| EP | 0740407 B1 | 5/1985 |
| EP | 0 477 519 | 4/1992 |
| EP | 0594115 B1 | 4/1994 |
| EP | 0601352 A1 | 6/1994 |
| EP | 0 617 505 | 9/1994 |
| EP | 0639304 B1 | 2/1995 |
| EP | 0721693 B1 | 7/1996 |
| EP | 0761398 B1 | 3/1997 |
| EP | 0867065 B1 | 9/1998 |
| EP | 0 877 473 | 11/1998 |
| EP | 0924848 B1 | 6/1999 |
| EP | 1154554 A1 | 11/2001 |
| EP | 1145421 B1 | 7/2002 |
| EP | 1 343 241 | 9/2003 |
| EP | 1 345 309 | 9/2003 |
| EP | 1 374 653 | 1/2004 |
| EP | 1385261 A2 | 1/2004 |
| EP | 1425770 | 6/2004 |
| EP | 1580877 A2 | 9/2005 |
| EP | 1596491 | 11/2005 |
| EP | 1 683 169 | 7/2006 |
| EP | 1014543 B1 | 10/2006 |
| EP | 1 788 686 | 5/2007 |
| EP | 1 873 800 | 1/2008 |
| EP | 2 050 112 | 4/2009 |
| EP | 2 100 702 | 9/2009 |
| EP | 2404375 B1 | 1/2012 |
| EP | 2410650 | 1/2012 |
| EP | 2433757 | 3/2012 |
| EP | 2509212 A2 | 10/2012 |
| EP | 2517349 A2 | 10/2012 |
| FR | 2 699 487 | 6/1994 |
| GB | 1 197 396 | 7/1970 |
| GB | 1339352 A | 12/1973 |
| GB | 1 484 296 | 9/1977 |
| GB | 2 046 642 | 11/1980 |
| GB | 2046642 A | 11/1980 |
| GB | 2052170 A | 1/1981 |
| JP | 58-039551 | 3/1953 |
| JP | 55049903 A | 4/1980 |
| JP | S55058786 A | 5/1980 |
| JP | S5612881 A | 2/1981 |
| JP | S5725182 A | 2/1982 |
| JP | H01308200 A | 12/1989 |
| JP | 0421377 A | 1/1992 |
| JP | H0473075 A2 | 3/1992 |
| JP | 5-305554 A | 11/1993 |
| JP | H0586413 U | 11/1993 |
| JP | H07184392 A | 7/1995 |
| JP | 2000209885 A | 7/2007 |
| JP | 2008-271612 | 11/2008 |
| JP | 2009-040422 | 2/2009 |
| WO | 8803337 A1 | 5/1988 |
| WO | 9103866 A1 | 3/1991 |
| WO | 2005/028269 | 3/2005 |
| WO | 2006057548 A1 | 6/2006 |
| WO | 2010099787 | 9/2010 |
| WO | 2013149780 A2 | 10/2013 |
| WO | 2013152900 A2 | 10/2013 |

OTHER PUBLICATIONS

"AVR443: Sensor-based Control of Three Phase Brushless DC Motor", Rev. 2596B-AVR-02/06, 2006 Atmel Corporation.
Notice of Allowance dated Jul. 9, 2013 issued in U.S. Appl. No. 13/247,250.
Extended EP Search Report dated Apr. 29, 2016 issued in corresponding EP application No. 15168493.3.
Non Final Office Action dated Aug. 4, 2016 issued in corresponding U.S. Appl. No. 14/717,010.
Notice of Allowance dated Nov. 22, 2016 issued in corresponding U.S. Appl. No. 14/717,010.
EP Communication Article 94(3) in corresponding application No. 17155606.1.

* cited by examiner

ELECTRONIC BRAKING FOR A POWER TOOL HAVING A BRUSHLESS MOTOR

RELATED APPLICATION

This application claims the benefit of U.S. Provisional Patent Application Ser. No. 62/294,684 filed Feb. 12, 2016.

FIELD OF THE DISCLOSURE

This disclosure relates to power tools, particularly, power tool such as grinders having brushless motors.

BACKGROUND

Kickback is defined as that condition when the power driven tool or other implement abnormally and rapidly engages the workpiece in such a manner as to transfer at a high rate the power of the motive power source and/or the inertial energy of the power tool to the power tool or the workpiece or both resulting in an undesired and generally uncontrolled motion of the power tool or the workpiece or both. Kickback may be caused by a variety of factors including, for example, non-uniform hardness of the workpiece or presence of a foreign object within the workpiece. For example, in a grinder with a grinding or a cutting accessory, the workpiece may pinch the accessory to cause a kickback. As the motor continues to rotate, the accessory may rotate in the pinch, pulling the grinder away from the user's hand. At times the angular momentum of the accessory may even cause the grinder to hit the user's face or body. What is desired is a mechanism internal to the tool that can prevent kickback, particularly in the event of a pinch.

In recent years, braking mechanisms have been introduces to brake and stop the motor in the event of various fault conditions (e.g., detection of a pinch), or, in some power tools, upon the user releasing the tool trigger switch. The problem with many braking mechanisms is that the strong and abrupt braking of the motor may not be suitable for all power tool applications. For example, in some power tools, such as grinders, abrupt braking of the motor may cause the grinding wheel to loosen and come off the spindle. Also, some fault conditions may require the motor to come to a full stop more abruptly than others. What is needed is an improved braking mechanism.

BRIEF DESCRIPTION OF THE DRAWINGS

In the accompanying drawings which form part of the specification.

Corresponding reference numerals indicate corresponding parts throughout the several figures of the drawings.

SUMMARY

Figure 1:
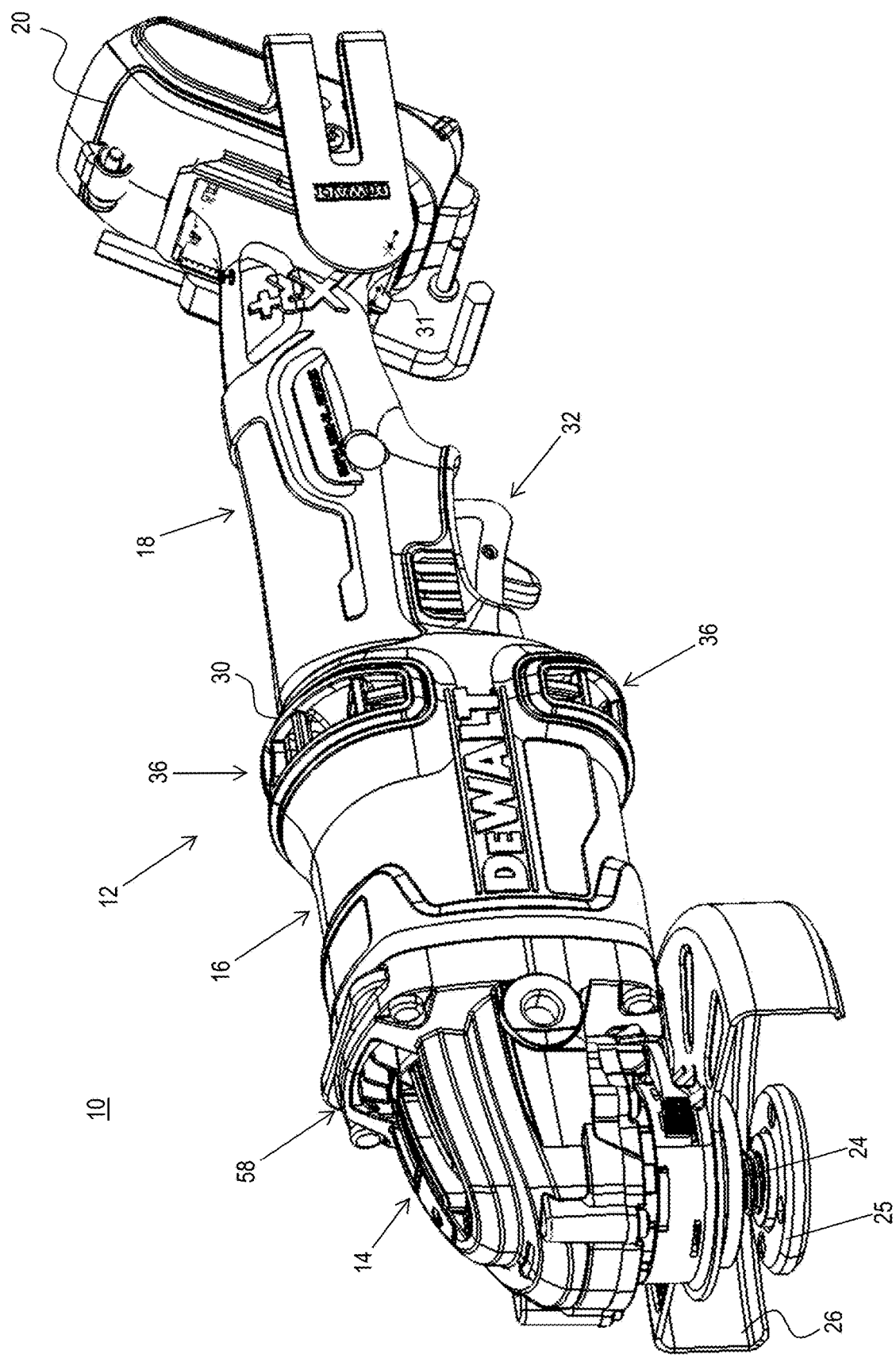
FIG. 1 is a front perspective view of a power tool, in accordance with an embodiment.

According to an embodiment of the invention, a power tool is provided including a housing, a brushless direct-current (BLDC) electric motor disposed inside the housing, power switches disposed between a power supply and the electric motor and including high-side switches and low-side switches, and a control unit configured to control a switching operation of the power switches to operate the electric motor and electronically brake the motor by simultaneously activating the high-side switches or the low-side switches to stop the rotation of the motor upon detection of a condition prompting the braking of the motor. In an embodiment, the control unit is configured to: detect the condition that prompts the braking of the electric motor, set a braking profile for braking the electric motor based on the detected condition, and execute braking of the electric motor using the braking profile.

In an embodiment, the control unit is configured to execute braking of the electric motor using a first braking profile when detecting a first condition, and using a second braking profile when detecting a second condition, where the first braking profile is configured to stop the rotation of the motor faster than the second braking profile In an embodiment, the first condition is a pinch condition, and the second condition is a motor stop or fault condition.

In an embodiment, the first profile includes a hard braking profile, where the control unit activates the three high-side switches or the three low-side switches simultaneously to apply braking force to the motor throughout substantially the entire length of the braking. In an embodiment, in the execution of hard braking profile, the control unit activates the high-side switches within a first braking period and low-side switches within a second braking period, and introduces a small delay period between the first and second braking periods.

In an embodiment, the second profile includes a soft braking profile wherein, during a braking cycle, the control unit activates the three high-side switches or the three low-side switches simultaneously during a braking period, and deactivates all the plurality of power switches during a coasting period following the braking period. In an embodiment, a duty cycle of the braking period within the braking cycle is less than or equal to 95%.

In an embodiment, the control unit is configured detect a rotational speed of the motor and set a duty cycle of the braking period within the braking cycle as a function of the rotational speed of the motor.

In an embodiment, the braking profile includes a first braking segment followed by a second braking segment. In an embodiment, the control unit executed hard braking to apply a first braking force to the motor during the first braking segment, and executes soft braking to apply to a second braking force to the motor during the second braking segment, where the second braking force is less than the first braking force. In an embodiment, the control unit is configured to monitor a rotational speed of the motor and switch from the first braking segment to the second braking segment when the rotational speed of the motor falls below a predetermined threshold speed.

In an embodiment, the control unit executed soft braking to apply a first braking force to the motor during the first braking segment, and executes hard braking to apply to a second braking force to the motor during the second braking segment, where the first braking force is less than the second braking force.

According to an embodiment of the invention, power tool is provided including a housing, a brushless direct-current (BLDC) electric motor disposed inside the housing, power switches disposed between a power supply and the electric motor and including high-side switches and low-side switches, and a control unit configured to control a switching operation of the power switches to operate the electric motor and electronically brake the motor by simultaneously activating the high-side switches or the low-side switches to stop the rotation of the motor upon detection of a condition prompting the braking of the motor. In an embodiment, the control unit is configured to execute hard braking having a first braking force on the motor within a first braking segment, and apply soft braking having a second braking force on the motor within a second braking segment, wherein the first braking force is greater than the second braking force.

In an embodiment, when executing soft braking, during a braking cycle, the control unit activates the three high-side switches or the three low-side switches simultaneously during a braking period, and deactivates all the plurality of power switches during a coasting period following the braking period.

According to an embodiment of the invention, a power tool is provided including a housing, a brushless direct-current (BLDC) electric motor disposed inside the housing, power switches disposed between a power supply and the electric motor and including high-side switches and low-side switches, and a control unit configured to control a switching operation of the power switches to operate the electric motor. In an embodiment, the control unit is configured to: allow the electric motor to coast by deactivating the plurality of power switches, monitor voltage across a bus line between the power supply and the plurality of power switches, and execute weak motoring of the electric motor if the voltage across the bus line exceeds an upper voltage threshold until the voltage across the bus line is at a nominal value.

DETAILED DESCRIPTION

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

Figure 2:
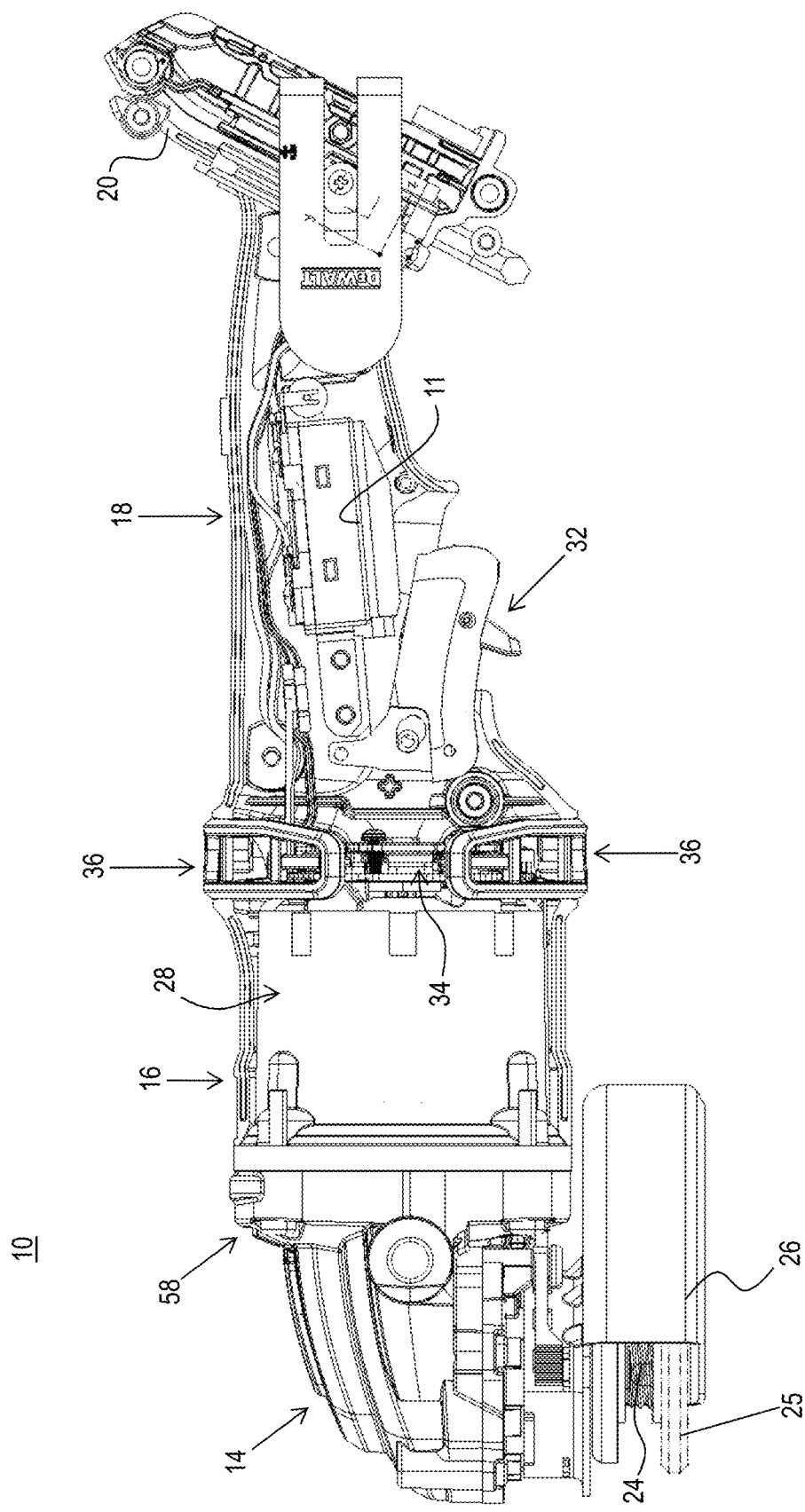
FIG. 2 is a side view of the power tool partially showing internal components of the power tool, in accordance with an embodiment.
Figure 3:
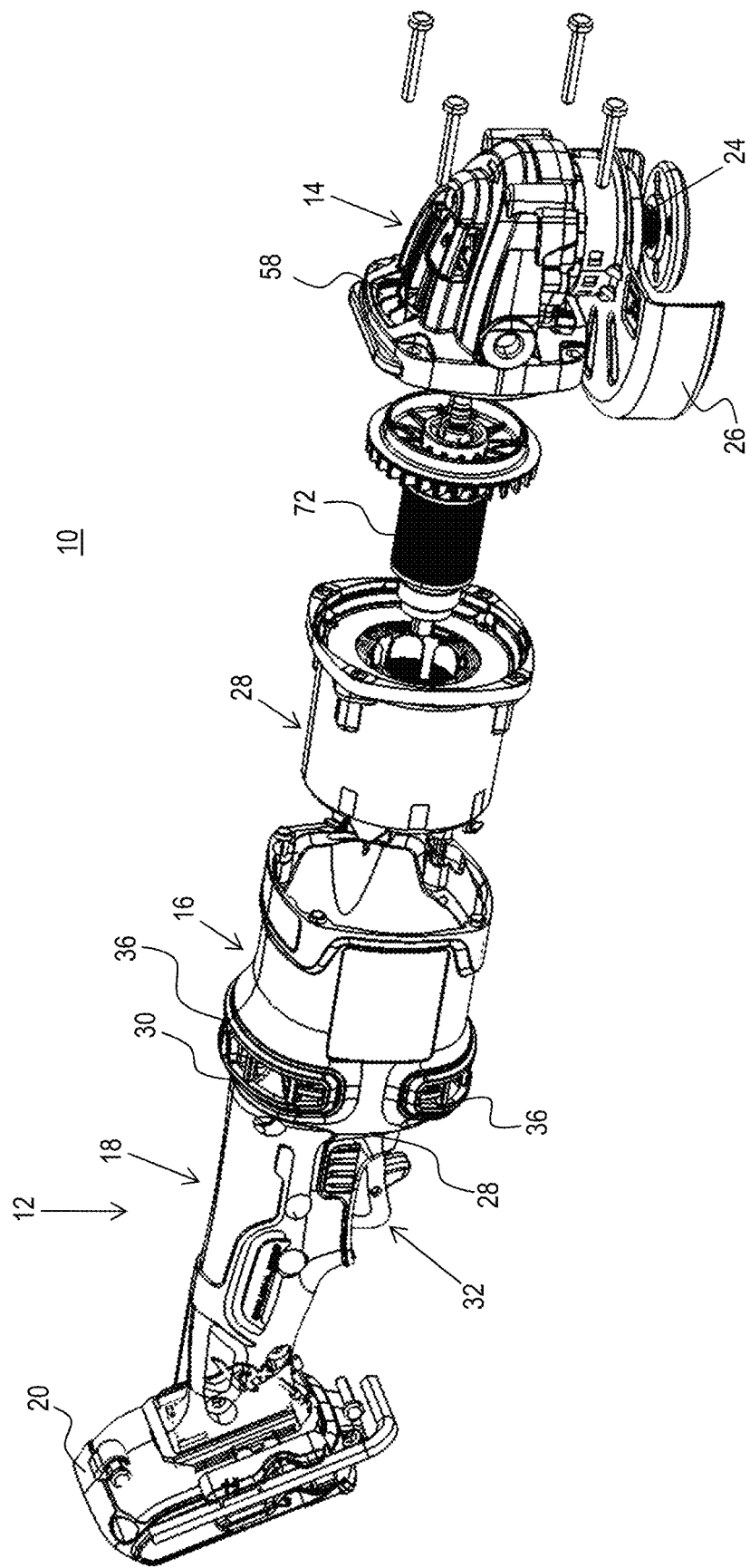
FIGS. 3 and 4 depict front and rear perspective exploded view of the power tool, in accordance with an embodiment.
Figure 4:
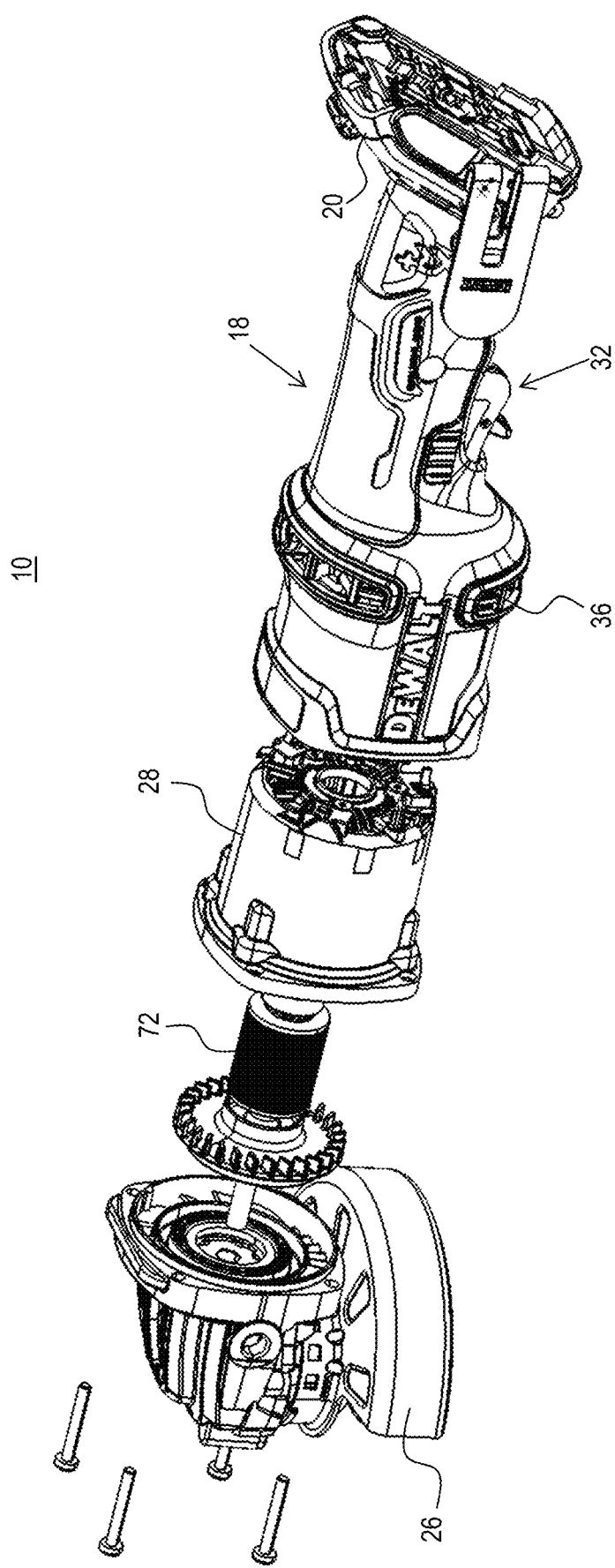

As shown in FIGS. 1-4, according to an embodiment of the invention, a power tool 10 is provided including a housing 12 having a gear case 14, a field case 16, a handle portion 18, and a battery receiver 20. FIG. 1 provides a perspective view of the tool 10. FIG. 2 provides a side view of tool 10 including its internal components. FIGS. 3 and 4 depict two exploded views of tool 10. Power tool 10 as shown herein is an angle grinder with the gear case 14 housing a gear set (not shown) that drives a spindle 24 arranged to be coupled to a grinding or cutting disc (not shown) via a flange (or threaded nut) 25 and guarded by a disc guard 26. It should be understood, however, that the teachings of this disclosure may apply to any other power tool including, but not limited to, a saw, drill, sander, and the like.

In an embodiment, the field case 16 attaches to a rear end of the gear case 14 and houses a motor 28 operatively connected to the gear set 22. The handle portion 18 attaches to a rear end 30 of the field case 16 and includes a trigger assembly 32 operatively connected to a control module 11 disposed within the handle portion 18 for controlling the operation of the motor 28. The battery receiver 20 extends from a rear end 31 of the handle portion 18 for detachable engagement with a battery pack (not shown) to provide power to the motor 28. The control module 11 is electronically coupled to a power module 34 disposed substantially adjacent the motor 28. The control module 11 controls a switching operation of the power module 34 to regulate a supply of power from the battery pack to the motor 28. The control module 11 uses the input from the trigger assembly 32 to control the switching operation of the power module 34. In an exemplary embodiment, the battery pack may be a 60 volt max lithium-ion type battery pack, although battery packs with other battery chemistries, shapes, voltage levels, etc. may be used in other embodiments.

In various embodiments, the battery receiver 20 and battery pack may be a sliding pack disclosed in U.S. Pat. No. 8,573,324, hereby incorporated by reference. However, any suitable battery receiver and battery back configuration, such as a tower pack or a convertible 20V/60V battery pack as disclosed in U.S. patent application Ser. No. 14/715,258 filed May 18, 2015, also incorporated by reference, can be used. The present embodiment is disclosed as a cordless, battery-powered tool. However, in alternate embodiments power tool can be corded, AC-powered tools. For instance, in place of the battery receiver and battery pack, the power tool 10 include an AC power cord coupled to a transformer block to condition and transform the AC power for use by the components of the power tools. Power tool 10 may for example include a rectifier circuit adapted to generate a positive current waveform from the AC power line. An example of such a tool and circuit may be found in US Patent Publication No. 2015/0111480, filed Oct. 18, 2013, which is incorporated herein by reference in its entirety.

Referring to FIG. 2, the trigger assembly 32 is a switch electrically connected to the control module 11 as discussed above. The trigger assembly 32 in this embodiment is an ON/OFF trigger switch pivotally attached to the handle 18. The trigger 32 is biased away from the handle 18 to an OFF position. The operator presses the trigger 32 towards the handle to an ON position to initiate operation of the power tool 10. In various alternate embodiments, the trigger assembly 32 can be a variable speed trigger switch allowing the operator to control the speed of the motor 28 at no-load, similar to variable-speed switch assembly disclosed in U.S. Pat. No. 8,573,324, hereby incorporated by reference. However, any suitable input means can be used including, but not limited to a touch sensor, a capacitive sensor, or a speed dial.

In an embodiment, power tool 10 described herein is high-power power tool configured to receive a 60V max battery pack or a 60V/20V convertible battery pack configured in its 60V high-voltage-rated state. The motor 28 is accordingly configured for a high-power application with a stator stack length of approximately 30 mm. Additionally, as later described in detail, the power module 34, including its associated heat sink, is located within the field case 16 in the vicinity of the motor 28.

While embodiments depicted herein relate to a DC-powered power tool powered by a battery pack, it is noted that the teachings of this disclosure also apply to an AC-powered tool, or an AC/DC power tool as disclosed in WO2015/179318 filed May 18, 2015, which is incorporated herein by reference in its entirety.

Figure 5:
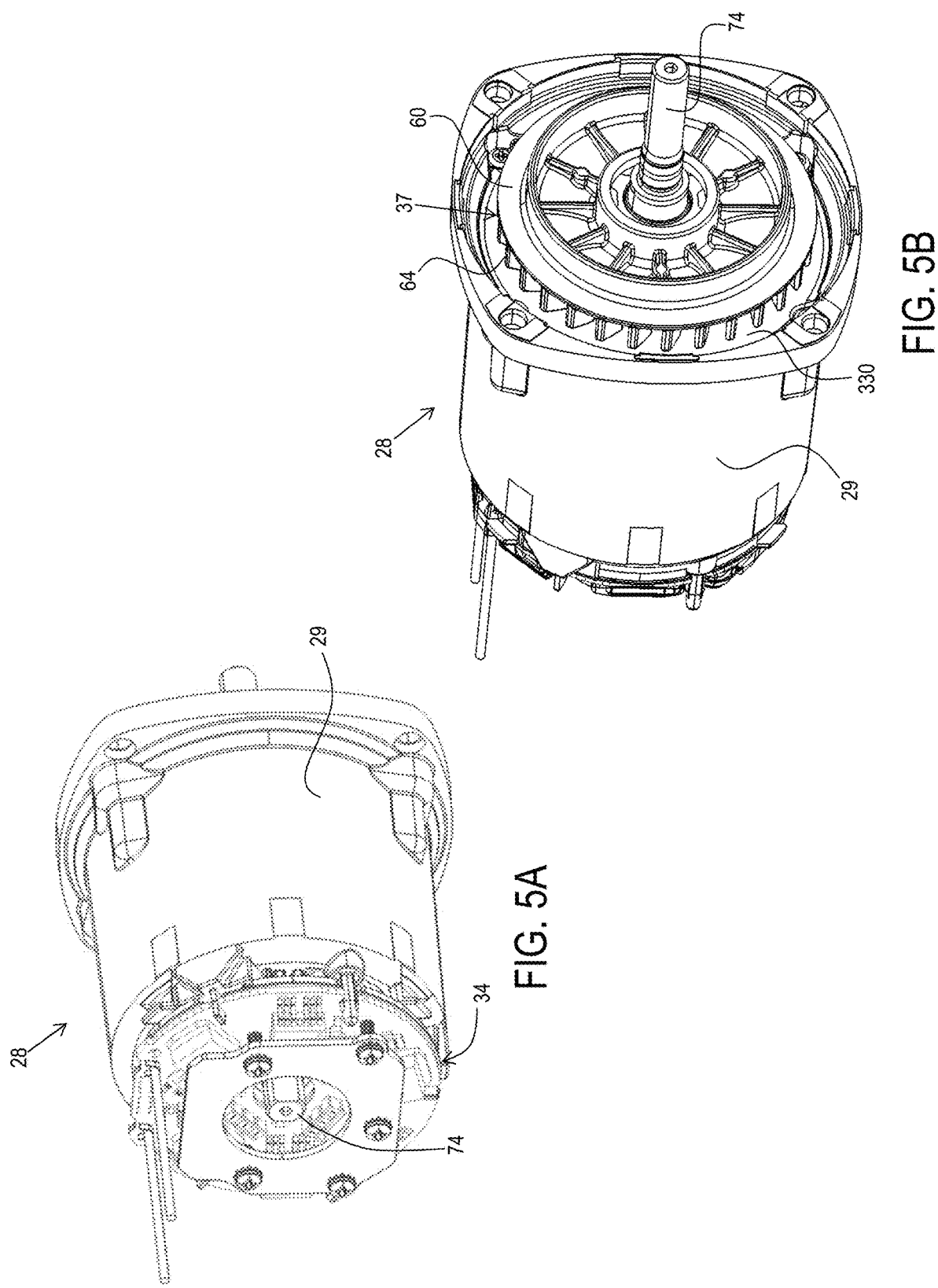
FIGS. 5A and 5B depict rear and front perspective views of the motor assembly, in accordance with an embodiment.
Figure 6:
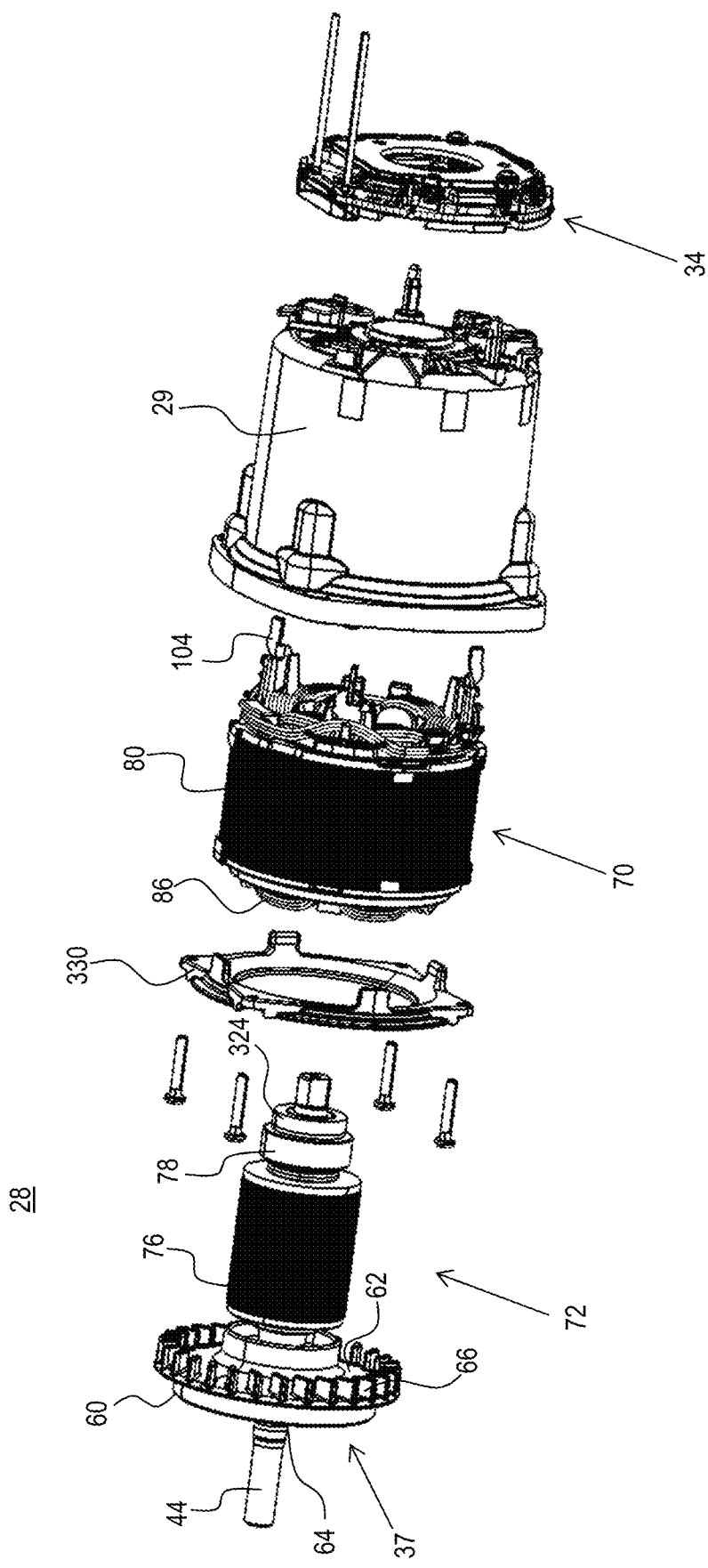
FIG. 6 is a perspective exploded view of a motor assembly, in accordance with an embodiment.

FIGS. 5A and 5B depict two perspective views of motor 28, according to an embodiment. FIG. 6 depicts an exploded view of the motor 28, according to an embodiment. As shown in these figures, the motor 28 is a three-phase brushless DC (BLDC) motor having a can or motor housing 29 sized to receive a stator assembly 70 and a rotor assembly 72. Various aspects and features of the motor 28 are described herein in detail. It is noted that while motor 28 is illustratively shown in FIGS. 1-9 as a part of an angle grinder, motor 28 may be alternatively used in any power tool or any other device or apparatus.

In an embodiment, rotor assembly 72 includes a rotor shaft 74, a rotor lamination stack 76 mounted on and rotatably attached to the rotor shaft 74, a rear bearing 78 arranged to axially secure the rotor shaft 74 to the motor housing 29, a sense magnet ring 324 attached to a distal end of the rotor shaft 74, and fan 37 also mounted on and rotatably attached to the rotor shaft 74. In various implementations, the rotor lamination stack 76 can include a series of flat laminations attached together via, for example, an interlock mechanical, an adhesive, an overmold, etc., that house or hold two or more permanent magnets (PMs) therein. The permanent magnets may be surface mounted on the outer surface of the lamination stack 76 or housed therein. The permanent magnets may be, for example, a set of four PMs that magnetically engage with the stator assembly 70 during operation. Adjacent PMs have opposite polarities such that the four PMs have, for example, an N-S-N-S polar arrangement. The rotor shaft 74 is securely fixed inside the rotor lamination stack 76. Rear bearing 78 provide longitudinal support for the rotor 74 in a bearing pocket (described later) of the motor housing 29.

In an embodiment, fan 37 of the rotor assembly 72 includes a back plate 60 having a first side 62 facing the field case 16 and a second side 64 facing the gear case 14. A plurality of blades 66 extend axially outwardly from first side 62 of the back plate 60. Blades 64 rotate with the rotor shaft 44 to generate an air flow as previously discussed. When motor 28 is fully assembled, fan 37 is located at or outside an open end of the motor housing 28 with a baffle 330 arranged between the stator assembly 70 and the fan 37. The baffle 330 guides the flow of air from the blades 64 towards the exhaust vents 58.

Figure 7:
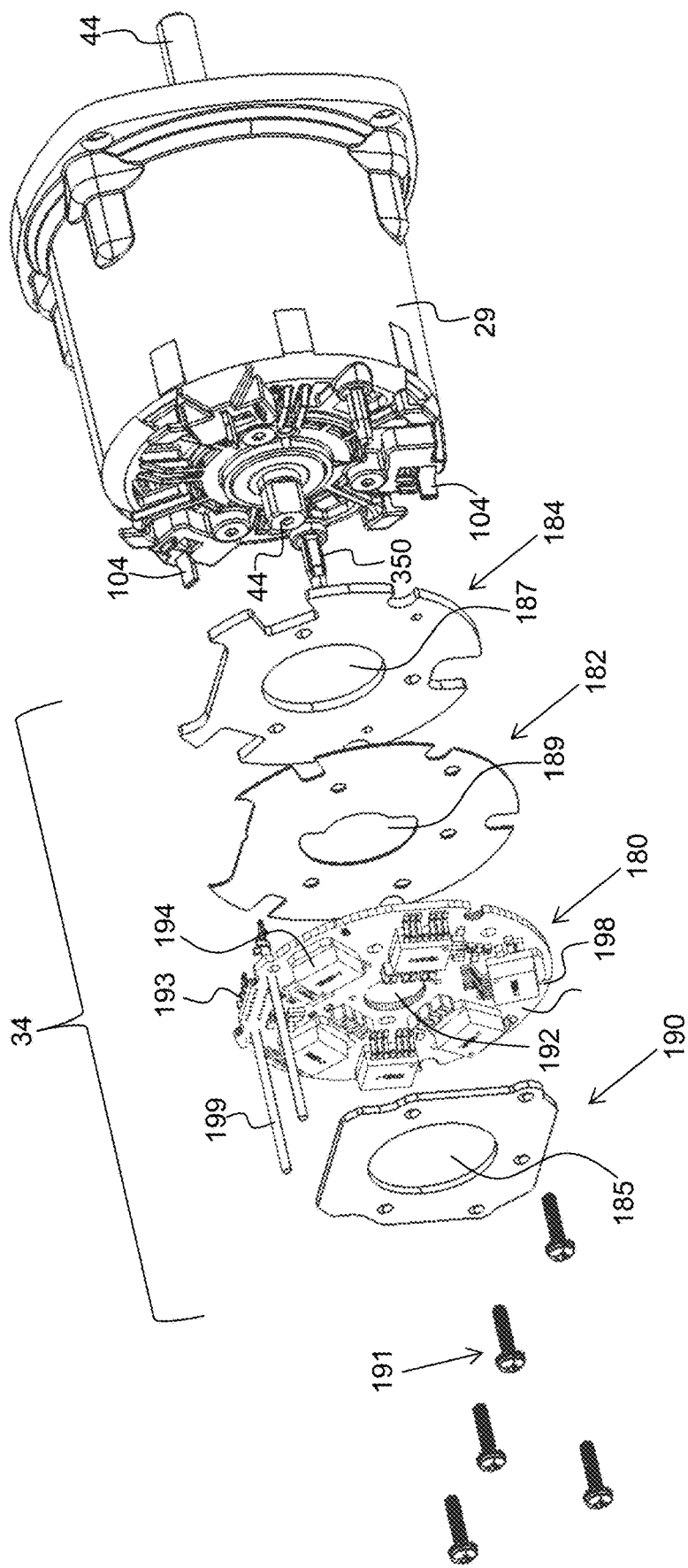
FIG. 7 is a perspective exploded view a stator assembly, in accordance with an embodiment.

FIG. 7 depict exploded views of the power module 34 adjacent the motor 28, according to an embodiment. As shown herein, in an embodiment, power module 34 includes a power board 180, a thermal interface 182, and a heat sink 184 which attach to the rear end of the motor housing 29 via fasteners 191. Power module 34 may be further provided with a clamp ring 190 that acts to clamp and cover the power board 180 and act as a secondary heat sink. Power module 34 may be disc-shaped to match the cylindrical profile of the motor 28. Additionally, power module 34 may define a center through-hole 192 that extends through the power board 180 to accommodate the rotor shaft 44 in some embodiments. In an embodiment, through-holes 185, 187, and 189 similarly extend through the clamp ring 190, thermal interface 182, and heat sink 184, as further described later.

In an embodiment, power board 180 is a generally disc-shaped printed circuit board (PCB) with six power transistors 194, such as MOSFETs and/or IGTBs, that power the stator windings 86 of the motor 28, on a first surface thereof. Power board 180 may additionally include other circuitry such as the gate drivers, bootstrap circuit, and all other components needed to drive the MOSFETs and/or IGTBs. In addition, power board 180 includes a series of positional sensors (e.g., Hall sensors, not shown) on a second surface thereof opposite the first surface, as explained later in detail.

In an embodiment, power board 180 is electrically coupled to a power source (e.g., a battery pack) via power lines 199 for supplying electric power to the transistors 194. Power board 180 is also electrically coupled to a controller (e.g., inside control unit 11 in FIG. 2) via control terminal 193 to receive control signals for controlling the switching operation of the transistors 194, as well as provide positional signals from the positional sensors 322 to the controller. The transistors 194 may be configured, for example, as a three-phase bridge driver circuit including three high-side and three low-side transistors connected to drive the three phases of the motor 28, with the gates of the transistors 194 being driven by the control signals from the control terminal 193. Examples of such a circuit may be found in US Patent Publication No. 2013/0342144, which is incorporated herein by reference in its entirety. In an embodiment, power board 180 includes slots 198 for receiving and electrically connecting to the input terminals 104. In an embodiment, slots 198 may be defined and spread around an outer periphery of the power board 180. The outputs of the transistors bridge driver circuit is coupled to the motor 28 phases via these input terminals 104.

Figure 8:
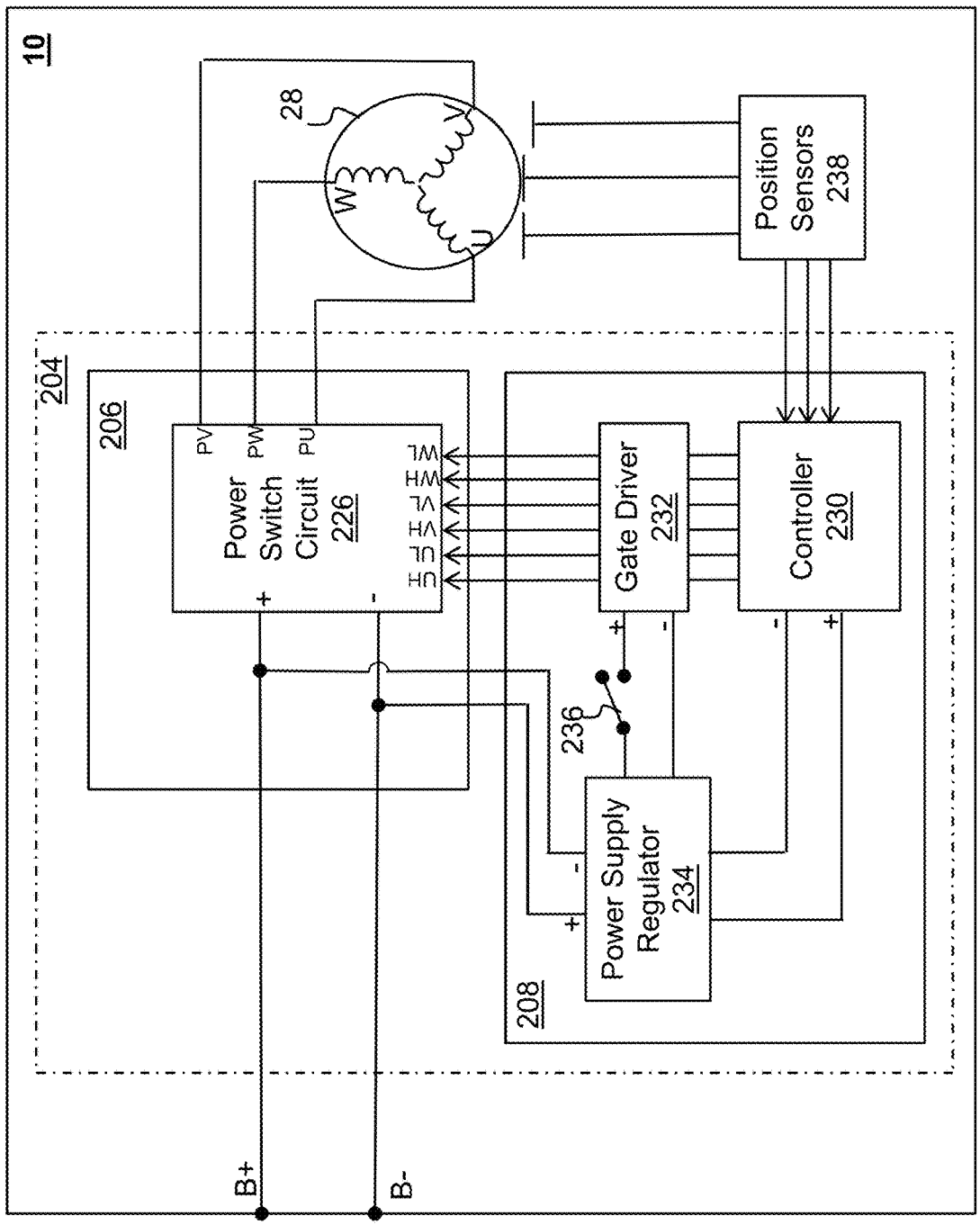
FIG. 8 depicts a circuit diagram for a DC power tool having a brushless DC motor, according to an embodiment.

Referring to FIG. 8, a circuit block diagram of power tool 10 including a motor 28 and a motor control circuit 204 is depicted, according to an embodiment. In an embodiment, motor control circuit 204 includes a power unit 206 and a control unit 208. In FIG. 8, power tool 10 received DC power from a DC power source such as a battery pack via B+ and B− terminals.

In an embodiment, power unit 206 may include a power switch circuit 226 coupled between the power source B+/B− terminals and motor windings to drive BLDC motor 28. In an embodiment, power switch circuit 226 may be a three-phase bridge driver circuit including six controllable semiconductor power devices (e.g. FETs, BJTs, IGBTs, etc.), such as power devices 198 shown in FIG. 7.

In an embodiment, control unit 208 may include a controller 230, a gate driver 232, a power supply regulator 234, and a power switch 236. In an embodiment, controller 230 is a programmable device arranged to control a switching operation of the power devices in power switching circuit 226. In an embodiment, controller 230 receives rotor rotational position signals from a set of position sensors 238 provided in close proximity to the motor 28 rotor. In an embodiment, position sensors 238 may be Hall sensors. It should be noted, however, that other types of positional sensors may be alternatively utilized. It should also be noted that controller 230 may be configured to calculate or detect rotational positional information relating to the motor 28 rotor without any positional sensors (in what is known in the art as sensorless brushless motor control). Controller 230 may also receive a variable-speed signal from variable-speed actuator or a speed-dial. Based on the rotor rotational position signals from the position sensors 238 and the variable-speed signal, controller 230 outputs drive signals UH, VH, WH, UL, VL, and WL through the gate driver 232, which provides a voltage level needed to drive the gates of the semiconductor switches within the power switch circuit 226 in order to control a PWM switching operation of the power switch circuit 226.

In an embodiment, power supply regulator 234 may include one or more voltage regulators to step down the power supply to a voltage level compatible for operating the controller 230 and/or the gate driver 232. In an embodiment, power supply regulator 234 may include a buck converter and/or a linear regulator to reduce the power voltage of power supply interface 128-5 down to, for example, 15V for powering the gate driver 232, and down to, for example, 3.2V for powering the controller 230.

In an embodiment, power switch 236 may be provided between the power supply regulator 234 and the gate driver 232. Power switch 236 may be an ON/OFF switch coupled to the ON/OFF trigger or the variable-speed actuator to allow the user to begin operating the motor 28, as discussed above. Power switch 236 in this embodiment disables supply of power to the motor 28 by cutting power to the gate drivers 232. It is noted, however, that power switch 236 may be provided at a different location, for example, within the power unit 206 between the rectifier circuit 220 and the power switch circuit 226. It is further noted that in an embodiment, power tool 128 may be provided without an ON/OFF switch 236, and the controller 230 may be configured to activate the power devices in power switch circuit 226 when the ON/OFF trigger (or variable-speed actuator) is actuated by the user.

Figure 9:
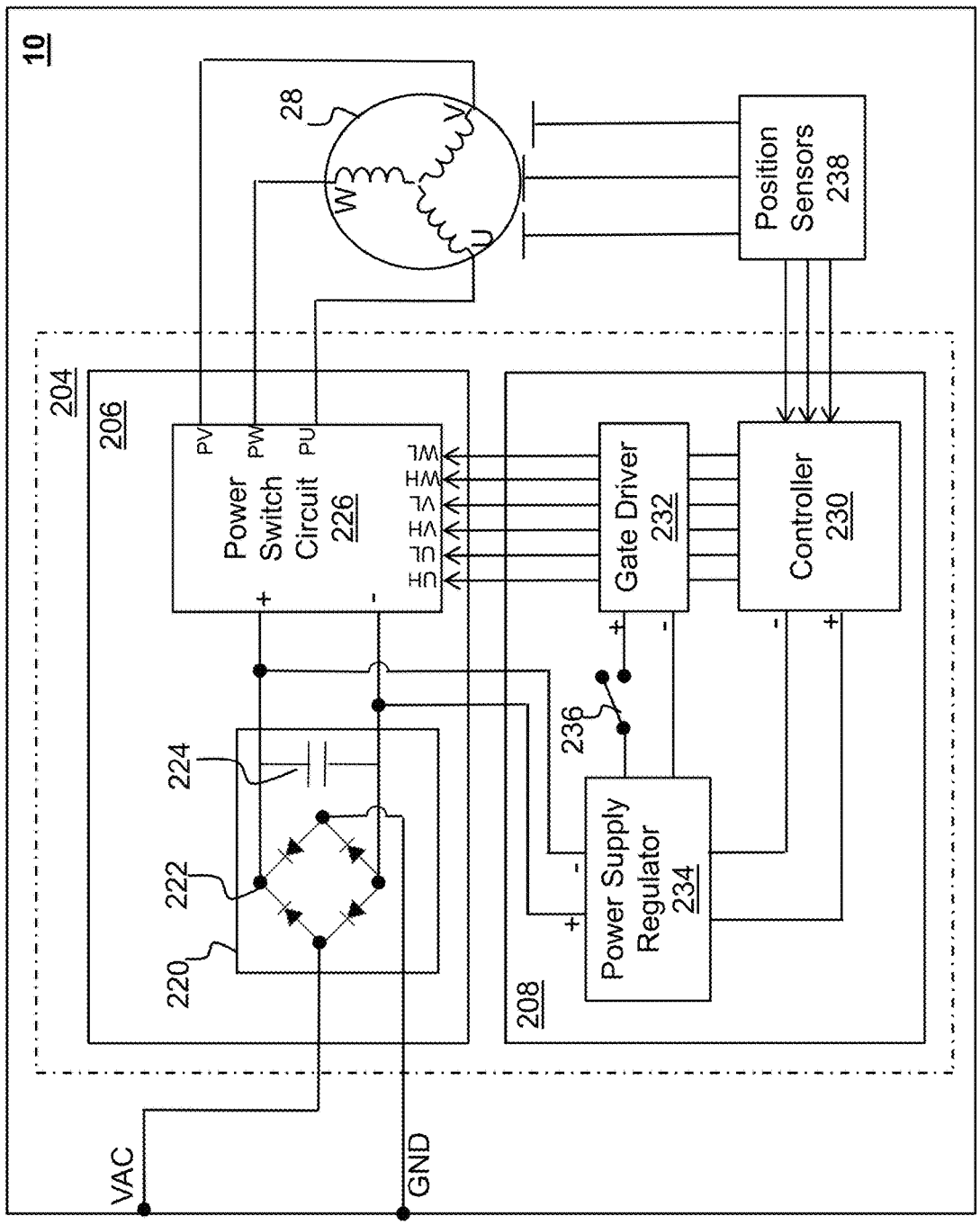
FIG. 9 depicts a circuit diagram for an AC power tool having a brushless DC motor, according to an embodiment.

FIG. 9 depicts a block circuit diagram of power tool 10 that received powers from an AC power supply such as, for example, an AC power generator or the power grid. As the name implies, BLDC motors are designed to work with DC power. Thus, in an embodiment, power unit 206 is provided with a rectifier circuit 220 between the power supply and the power switch circuit 226. In an embodiment, power from the AC power lines as designated by VAC and GND is passed through the rectifier circuit 220 to convert or remove the negative half-cycles of the AC power. In an embodiment, rectifier circuit 220 may include a full-wave bridge diode rectifier 222 to convert the negative half-cycles of the AC power to positive half-cycles. Alternatively, in an embodiment, rectifier circuit 220 may include a half-wave rectifier to eliminate the half-cycles of the AC power. In an embodiment, rectifier circuit 220 may further include a bus capacitor 224. In another embodiment, active rectification may be employed, e.g., for active power factor correction. In an embodiment, bus capacitor 224 may have a relatively small value to reduce voltage high-frequency transients on the AC power supply.

Figure 10:
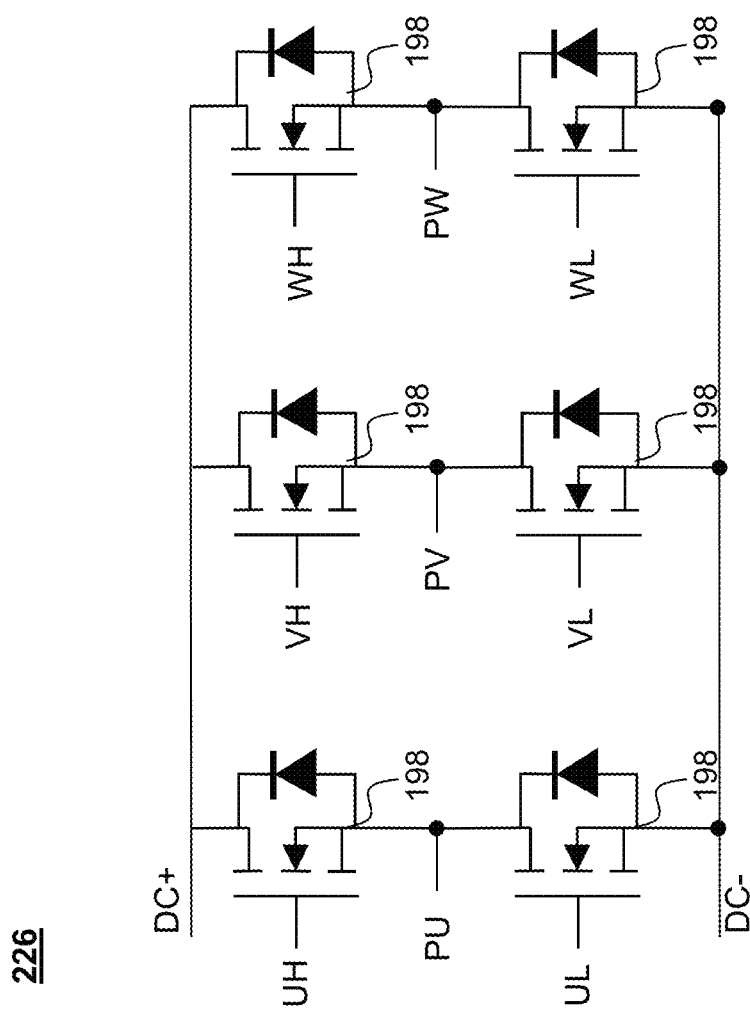
FIG. 10 depicts an exemplary power switch circuit 226 having a three-phase inverter bridge circuit, according to an embodiment.

FIG. 10 depicts an exemplary power switch circuit 226 having a three-phase inverter bridge circuit, according to an embodiment. As shown herein, the three-phase inverter bridge circuit includes three high-side FETs and three low-side FETs. The gates of the high-side FETs driven via drive signals UH, VH, and WH, and the gates of the low-side FETs are driven via drive signals UL, VL, and WL. In an embodiment, the drains of the high-side FETs are coupled to the sources of the low-side FETs to output power signals PU, PV, and PW for driving the BLDC motor 28.

Figure 11:
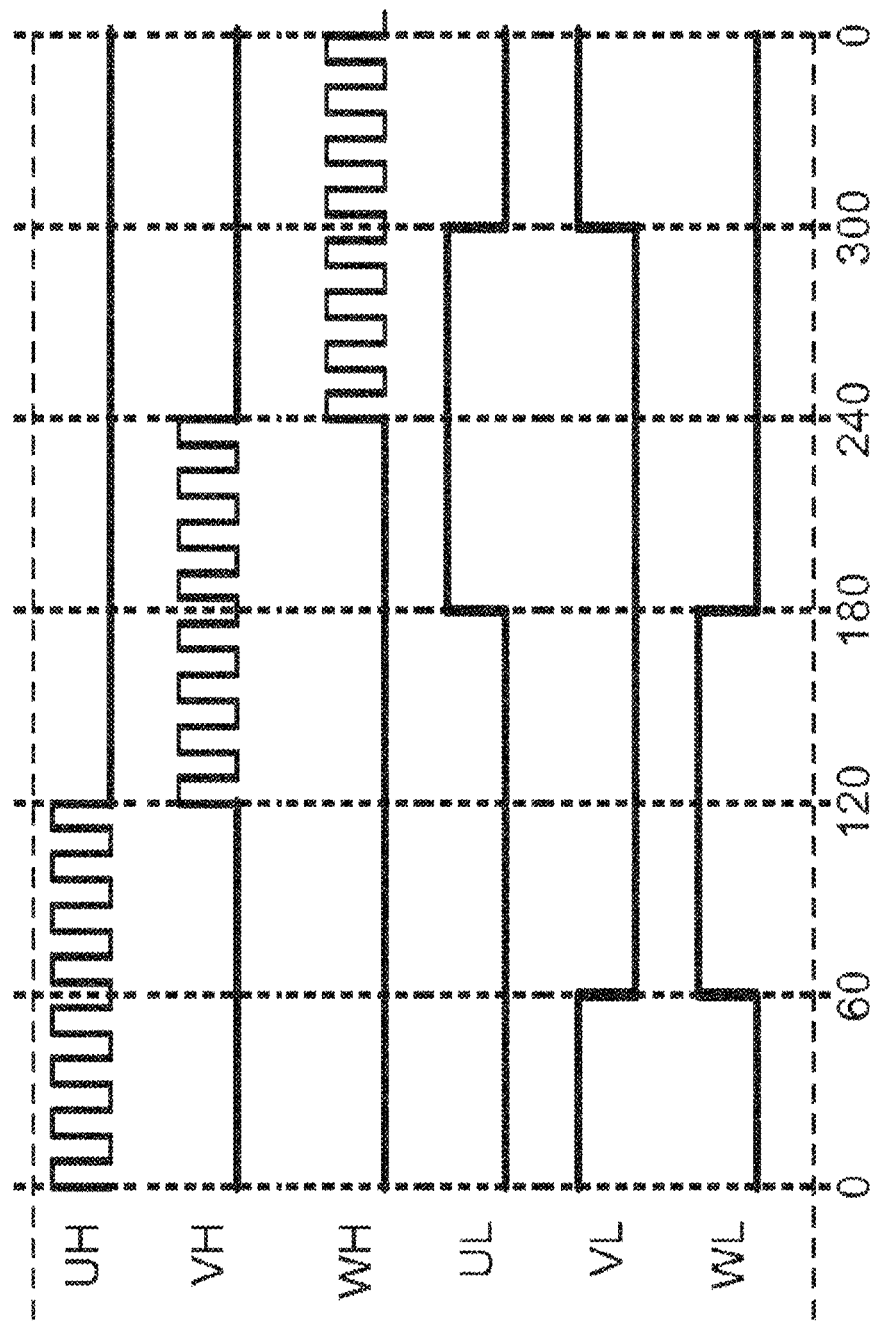
FIG. 11 depicts an exemplary waveform diagram of a pulse-width modulation (PWM) drive sequence of the three-phase inventor bridge, according to an embodiment.

FIG. 11 depicts an exemplary waveform diagram of a pulse-width modulation (PWM) drive sequence of the three-phase inventor bridge circuit of FIG. 10 within a full 360 degree conduction cycle. As shown in this figure, within a full 360° cycle, each of the drive signals associated with the high-side and low-side power switches is activated during a 120° conduction band ("CB"). In this manner, each associated phase of the BLDC 202 motor is energized within a 120° CB by a pulse-width modulated voltage waveform that is controlled by the control unit 208 as a function of the desired motor 28 rotational speed. For each phase, the high-side switch is pulse-width modulated by the control unit 208 within a 120° CB. During the CB of the high-side switch, the corresponding low-side switch is kept low, but one of the other low-side switches is kept high to provide a current path between the power supply and the motor windings. The control unit 208 controls the amount of voltage provided to the motor, and thus the speed of the motor, via PWM control of the high-side switches.

It is noted that while the waveform diagram of FIG. 11 depicts one exemplary PWM technique at 120° CB, other PWM methods may also be utilized. One such example is PWM control with synchronous rectification, in which the high-side and low-side switch drive signals (e.g., UH and UL) of each phase are PWM-controlled with synchronous rectification within the same 120° CB.

There are various events that may prompt the control unit 208 to stop motor commutation. Examples of such events include, but are not limited to, trigger-release by the user, a battery over-current condition (i.e., when the control unit 208 senses or receives a signal indicative of the current being drawn from the battery exceeds a predetermined threshold), a battery under-voltage condition (i.e., when the control unit 208 senses or receives a signal indicative of the battery voltage or the voltage on a battery cell or series of cells falls below a predetermined threshold), a battery or tool over-temperature condition (i.e., when the control unit 208 senses or receives a signal indicative of the battery or tool temperature being outside a predetermined temperature range), etc. Upon detection of such an event, the control unit 208 may stop commutation of the motor 28 and allow the motor 28 to coast down by deactivating all the high-side and low-side power switches 198. In this scenario, current resulting from the back-EMF (electro-magnetic force) voltage of the motor 28 is, if greater than the voltage on bus capacitor 224, conducted backwards through the anti-parallel diodes of the power switches 198 into the bus capacitor 224, and the motor 28 slowly slows down as a result of the internal friction between the motor components until it comes to a stop. It is noted that since BLDC motors do not benefit from the friction between brushes and the commutator present in conventional brushed motors during coasting, the coasting period may take longer than desired.

Alternatively, according to an embodiment, the control unit 208 may electronically brake the motor 28 by short-circuiting the high-side or low-side power switches 198. In an embodiment, control unit 208 may turn ON the three high-side power switches 198 simultaneously while the three low-side power switches 198 are turned off. Alternatively, control unit 208 may turn ON the three low-side power switches 198 simultaneously while the three high-side power switches 198 are turned off. This allows the back-EMF current of the motor 28 to circulate through the motor windings, thus stopping the rotation of the motor. Specifically, as the rotor 72 continues to spin inside the stator 70, the change in magnetic flux in the stator coils 86 resulting from the rotation of the rotor lamination stack 76 results in a back-EMF voltage developing on the stator coils 86. Short-circuiting the coils completes the circuit, allowing the back-EMF induced current to flow through the windings and dissipate, thus generating a braking force to stop the rotation of the rotor.

Figure 12:
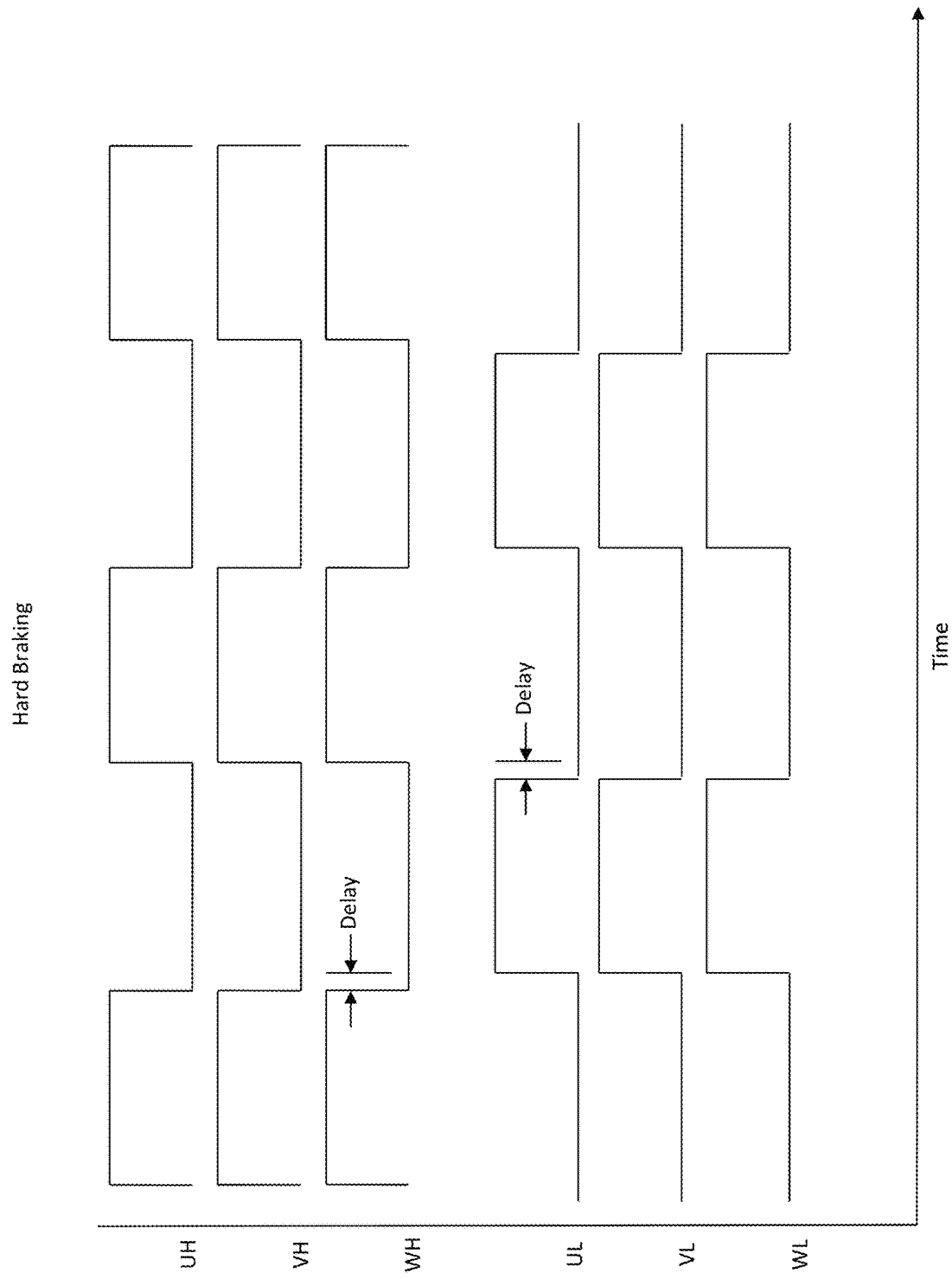
FIG. 12 depicts a waveform diagram for execution of hard braking, according to an embodiment.

FIG. 12 depicts a waveform diagram of a braking scheme, according to an embodiment. In this embodiment, the control unit 208 may alternatingly turn the high-side and low-side power switches 198 ON (i.e., simultaneously turning the high-side switches ON for a given period, followed by simultaneously turning the low-side switches ON for a given period) in order to distribute the braking current between the low-side and high-side switches 198. A small delay period is introduced between the high-side and low-side braking periods to ensure is no shoot-through of one high-side switch and one low-side switch of the same leg.

Figure 13:
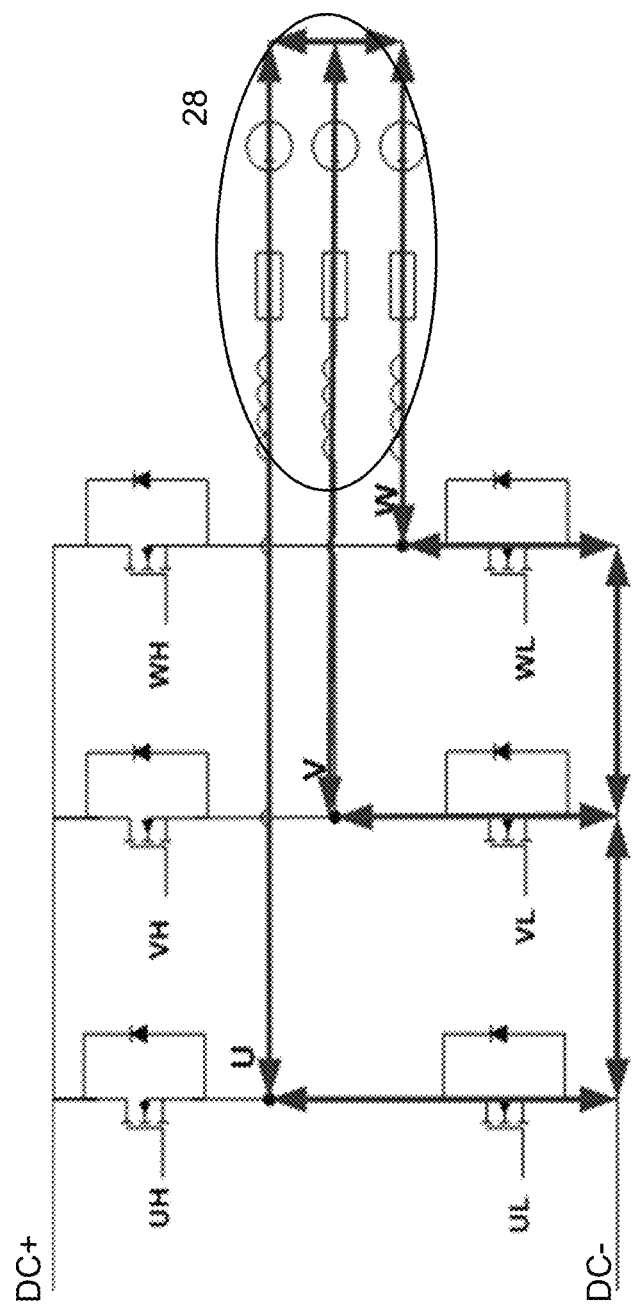
FIG. 13 depicts a circuit diagram of the three-phase inverter bridge circuit of the power switch circuit 226, showing the current path generated by the motor back-EMF when the three low-side switches are turned on simultaneously, according to an embodiment.

FIG. 13 depicts a circuit diagram of the three-phase inverter bridge circuit of the power switch circuit 226, showing the current path generated by the motor back-EMF when the three low-side switches are turned on simultaneously, according to an embodiment.

The above-described braking mechanism applies the full-force of the motor back-EMF to stop the rotation of the motor. Thus, in an exemplary embodiment, in a high-power portable cordless power tool 10, such as a grinder, that operates with a high voltage battery pack, for example, a battery pack having a maximum voltage of approximately 60V or nominal voltage of approximately 54V, and produces maximum power output of 1600 max-Watts-out, application of full braking force (also referred to as "hard brake") as described above brings the motor from a maximum speed of over 8000 RPM to full stop in approximately 0.2 to 0.4 seconds.

Hard braking may be defined as long periods of braking by simultaneously activating the high-side or low-side switches, followed by small delaying periods in between. In other words, hard braking is defined by braking cycles where the braking period has a significantly high duty cycle. In FIG. 12, for example, each braking period may be approximately 20-40 milliseconds, with a 1-5 microsecond delay in between. Thus, in the illustrated example of a hard brake, the braking period has a duty cycle of more than 99.99%. As understood by persons of ordinary skill in the art, the delay period herein is so small compared to the braking period that it the practical effect of the hard braking execution is to substantially apply braking force to the motor throughout the duration of the braking execution.

In an embodiment, hard braking may be appropriate in some circumstances. For example, in an embodiment, the control unit 208 may be configured to execute the above-described hard brake upon detection of certain events such as a pinch event, where it is desirable to brake the motor 28 as quickly as possible to prevent the tool from flying out of the user's hands. In an embodiment, a pinch event may be detected when the control unit 208 detects sudden deceleration of the motor 28 via the positional signals from the position sensors 238. Alternatively, a pinch event may be detected when the control unit 208 detects a large spike in motor current (i.e., current of more than a predetermined value), or based on a rate of change of speed, voltage, or current.

While hard braking may be desirable in some circumstances, in other circumstances it may be desirable to brake the motor more smoothly. In an embodiment, the control unit 208 may be configured to execute a "soft brake," as described below, upon detection of other events such as trigger release, a battery over-current condition, a battery under-voltage condition, a battery or tool over-temperature condition, etc. Additionally or alternatively, the control unit 208 may execute a braking profile that includes a combination of soft brake and hard brake periods. In an embodiment, the control unit 208 may have a designated braking profile associated with each of event that prompts braking the motor.

Figure 14:
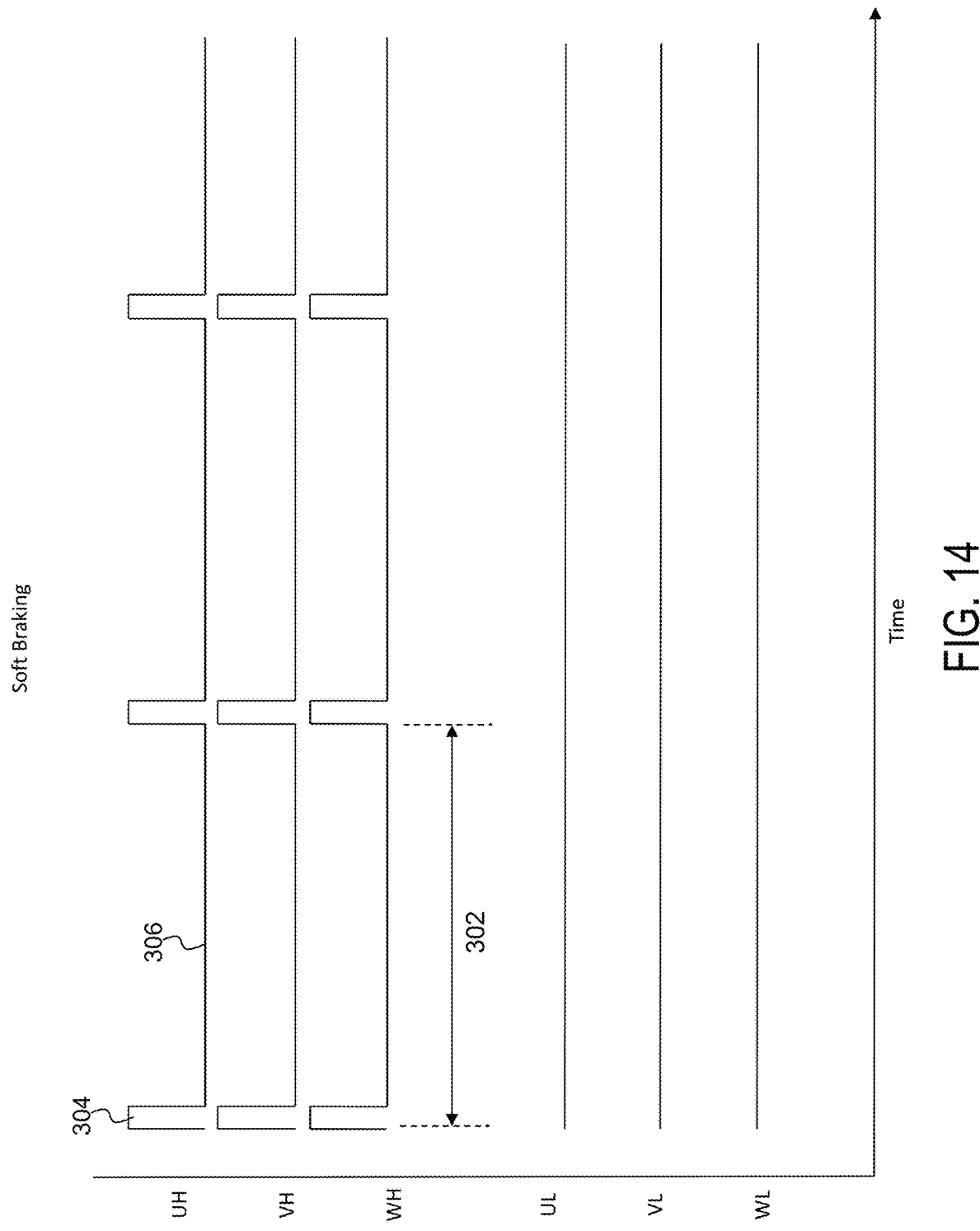
FIG. 14 depicts a waveform diagram for a soft braking scheme, according to an embodiment of the invention.

FIG. 14 depicts a waveform diagram for a soft braking scheme, according to an embodiment of the invention. As shown herein, when executing a soft brake by the control unit 208, the high-side (or low-side) power switches 198 are turned on simultaneously for a short period followed by a longer period in which all power switches 198 are kept OFF. In other words, the braking period is divided into multiple braking cycles 302, where each braking cycle 302 includes a braking period 304 followed by a relatively long coasting period 306. The control unit 208 may be configured to determine and control the braking period 304 as a percentage (i.e. duty cycle) of each braking cycle 302. In the exemplary embodiment depicted herein, the duty cycle of the braking period 304 may be approximately 5% to 10% of the braking cycle 302. It is noted, however, that depending on the system requirements and the desired braking speed, the duty cycle of the braking period may be significantly higher, e.g., 50% to 95% of the braking cycle 302.

While in FIG. 14 the high-side power switches 198 are simultaneously activated during each of the braking period 304, the low-side switches may alternatively be simultaneously activated. In an embodiment, the high-side and low-side switches 198 are alternatingly activated in successive braking cycles 302.

Soft braking allows the control unit 208 to control the time it takes to brake the motor 28. In an embodiment, the control unit 208 may be configured to set the duty cycle of the braking period 304 based on the rotational speed of the motor 28. For example, the control unit 208 may set the duty cycle of the braking period 304 to a higher value when the tool is running at full speed and to a lower value when the tool is running at a medium or low speed.

In an embodiment, the control unit 208 may be configured to vary the duty cycle of the braking period 304 based on the rotational speed of the motor 28, e.g., by gradually increasing or decreasing the duty cycle until the motor 28 comes to a stop.

In an embodiment, the control unit 208 may set various braking profiles corresponding to various braking events, tool settings, accessory settings, etc. For example, the control unit 208 may use different braking profiles for an over-temperature event and a trigger-release event. Also, the control unit 208 may use different braking profiles based on the tool setting (e.g., a drill's torque setting), or the accessory being used (e.g., a grinding wheel v. a cutting wheel for a grinder). A braking profile may include a hard brake, a linear soft brake, a non-linear soft brake, or a combination a hard brake and a soft brake. For example, a braking profile may include a period of hard braking followed by a period of soft braking, or vice versa.

Figure 15:
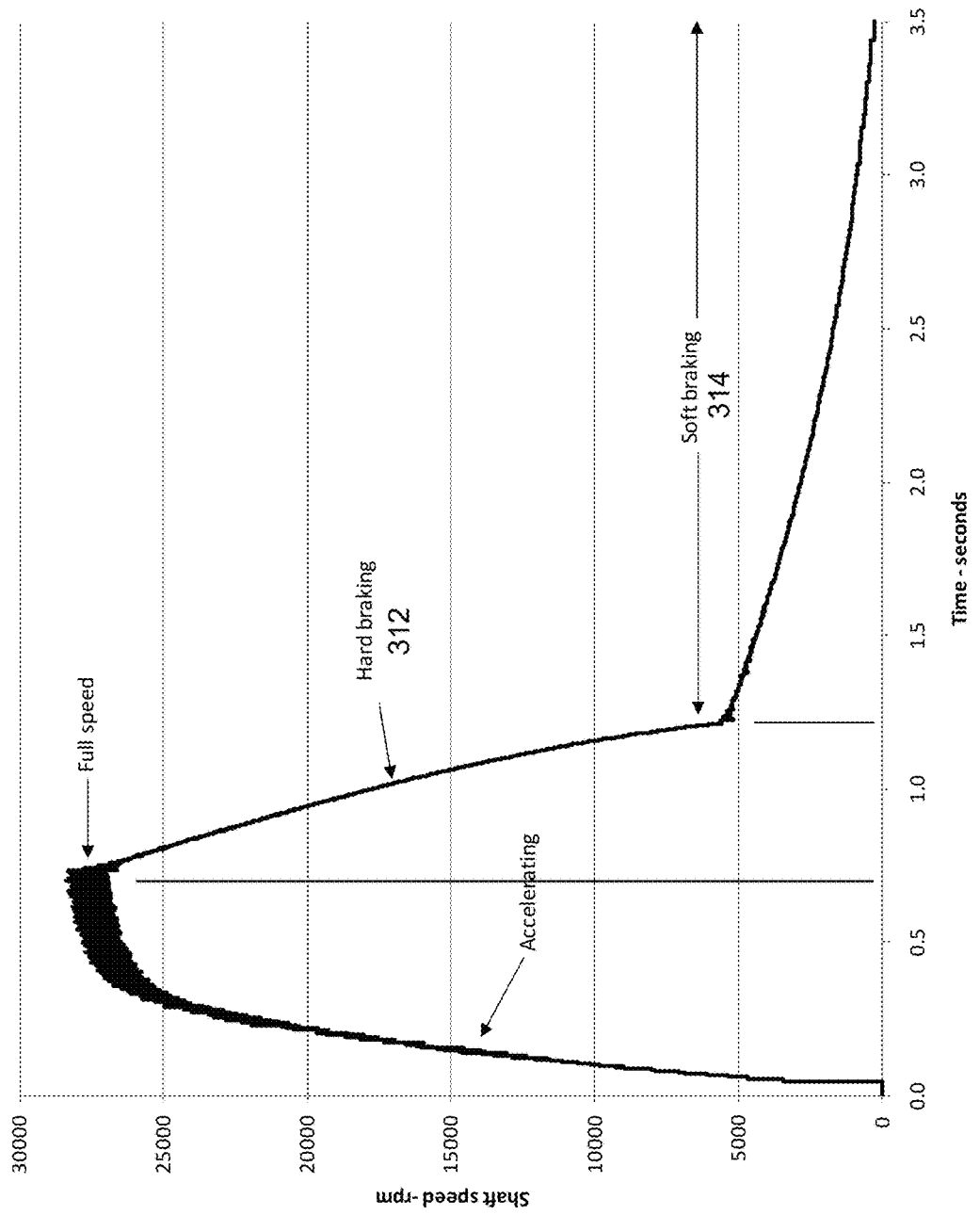
FIGS. 15 and 16 depict two exemplary braking profiles, according to an embodiment of the invention.
Figure 16:
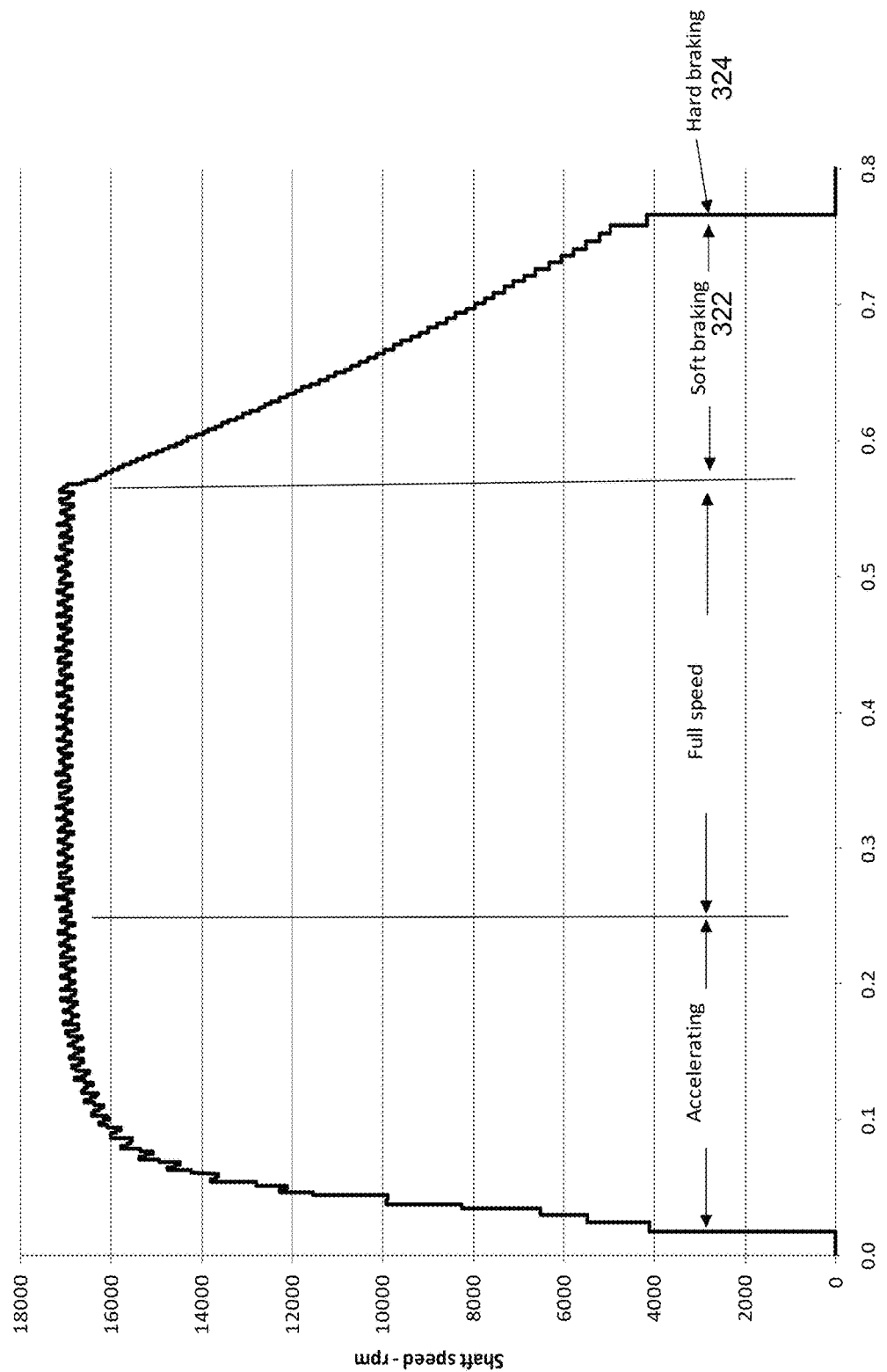

FIGS. 15 and 16 depict two exemplary braking profiles, according to an embodiment of the invention.

In FIG. 15, the braking cycle includes a hard braking segment 312, wherein the rotational speed of the motor quickly drops from approximately 27,000 rpm to approximately 5,000 rpm within approximately 0.5 second, followed by a soft braking segment 314, wherein the rotational speed of the motor drops from approximately 5,000 rpm to zero within approximately 3.2 seconds. In this exemplary embodiment, during the soft braking segment 314, the braking cycle may have a duty cycle of approximately 50% to 95%, preferably approximately 70% to 90%. Such a braking profile may be appropriate for, for example, trigger release in a grinder tool. In an embodiment, similar braking profiles with varying hard braking 312 and/or soft braking 314 slopes may be utilized for other events such as a battery over-current condition, a battery under-voltage condition, a battery or tool over-temperature condition, etc.

In FIG. 16, the braking cycle includes a soft braking segment 322, wherein the rotational speed of the motor gradually drops from approximately 17,000 rpm to approximately 4,000 rpm within approximately 0.2 seconds, followed by a hard braking segment 324, wherein the rotational speed of the motor quickly drops from approximately 4,000 rpm to zero in less than 0.01 second. Such a braking profile may be appropriate for, for example, a sensorless brushless power tool, where the voltage signals used by the control unit 208 to detect or deduce the speed of the rotor become weak at low speed (e.g., approximately 4,000 rpm), and thus the control unit 208 executed hard braking below that threshold.

Figure 17:
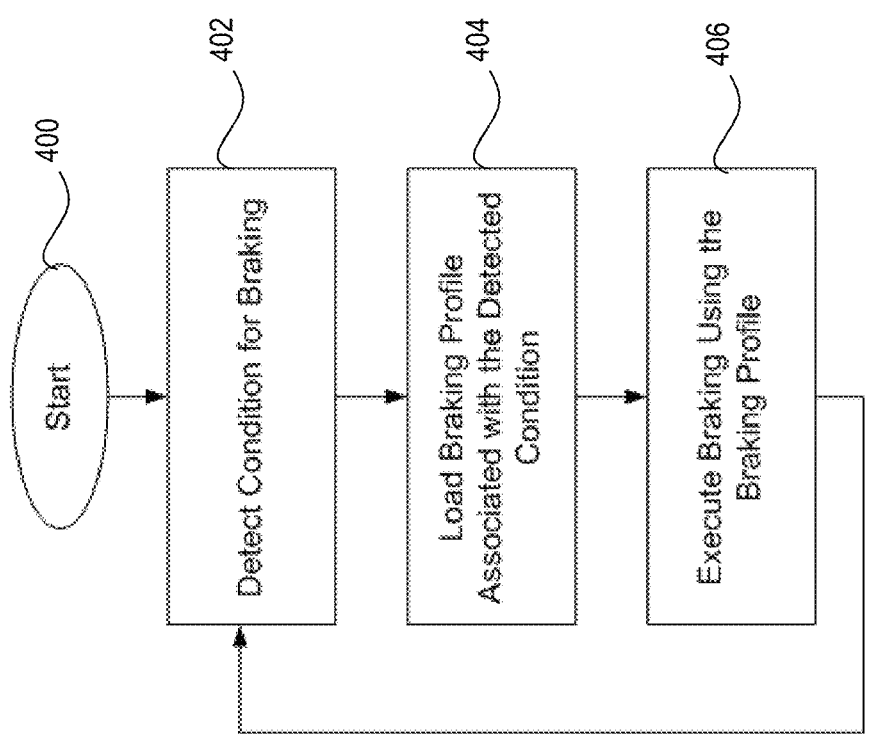
FIG. 17 depicts a flow diagram of a process utilized and executed by control unit 208 to brake the motor 28, according to an embodiment.

FIG. 17 depicts a flow diagram of a process utilized and executed by control unit 208 to brake the motor 28. In this process, which starts at 400, the control unit 208 proceeds to detect a condition for which it should brake the motor at 402. As previously discussed, such a condition may be a stall condition (e.g., by detection of sudden deceleration of the motor or a current spike), in which case the control unit 208 brakes the motor 28 as quickly as possible in order to prevent the tool from flying out of the user's hands. In this case, the control unit 208 will then load a "hard brake" braking profile in 404. Alternatively, the condition may be, for example, a trigger release by the user, or a tool and/or battery related fault condition (e.g., over-temperature, under-voltage, over-current, etc.). In this case, the control unit 208 will load a braking profile associated with that detected condition at 404. As discussed above, the braking profile may also vary based on the tool or accessory settings. In 406, the control unit 208 will proceed to execute braking in accordance with the chosen braking profile by activating and/or deactivating the power switches 198 in accordance with the braking profile.

Figure 18:
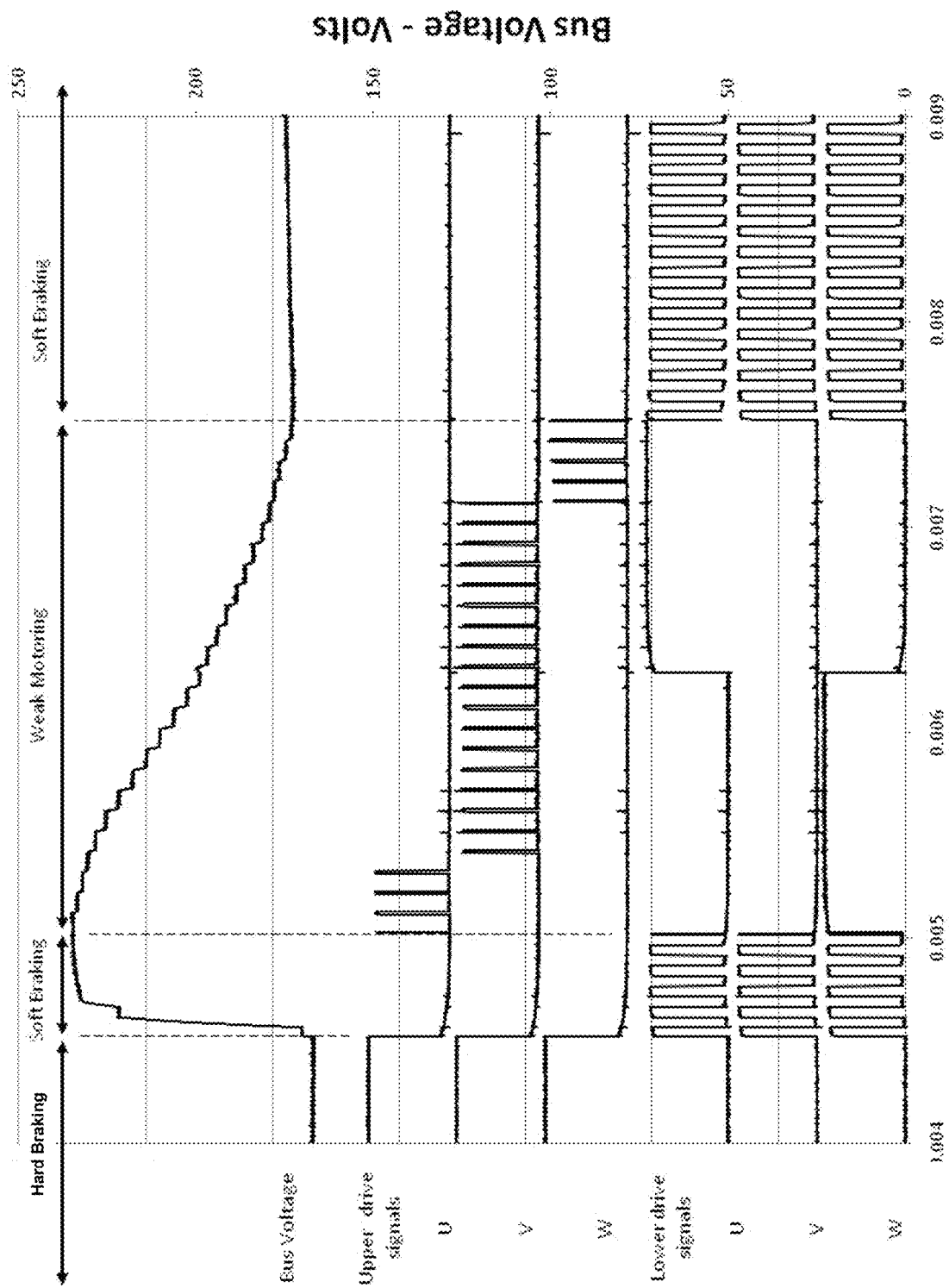
FIG. 18 depicts a waveform diagram of the bus voltage and drive signals of the motor, according to an embodiment.
Figure 19:
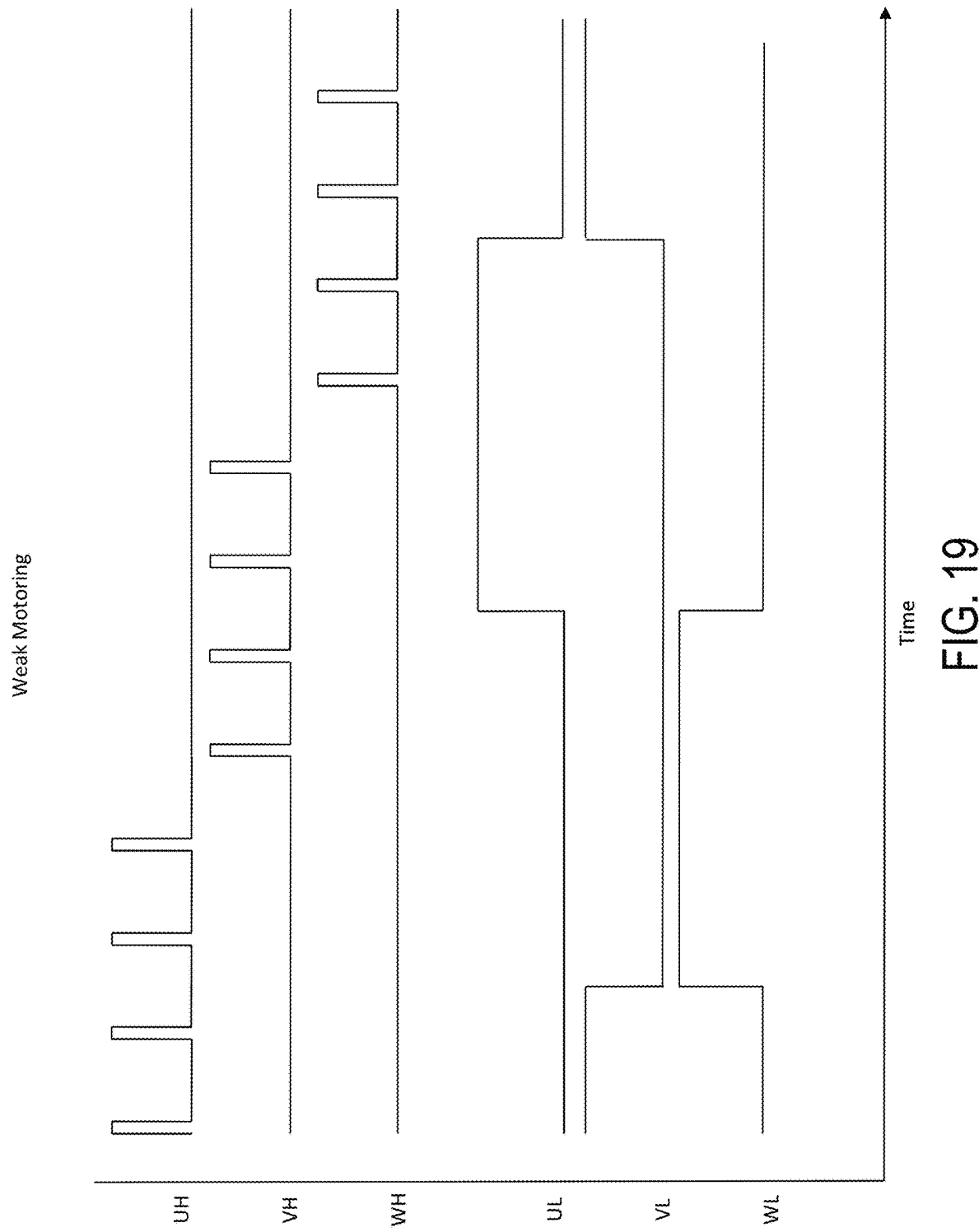
FIG. 19 depicts an exemplary commutation cycle during "weak motoring," according to an embodiment.
Figure 20:
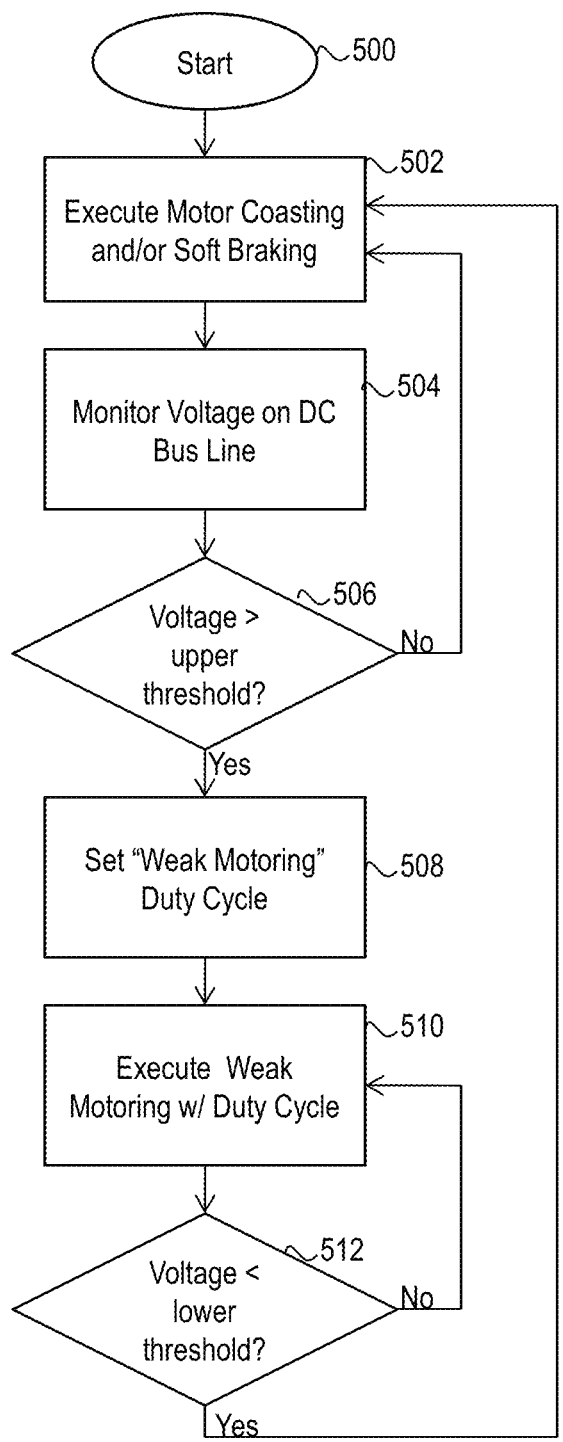
FIG. 20 depicts an exemplary process executed by control unit 208, according to an embodiment.

Another aspect of the invention is described herein with reference to FIGS. 18-20, according to an embodiment.

In DC power tools, during a period of motor coasting when the power switches 198 are all deactivated simultaneously, any residual current in the motor 28 that leads to a voltage across the DC bus line dissipates through the battery to the extent that the voltage across the DC bus line is higher than the battery voltage. By contrast, in AC power tools, the AC power supply does not allow the motor current to dissipate in a similar fashion. It was found by the inventors that in AC power tools, such as those embodying the circuit diagram of FIG. 9, or in AC/DC power tools coupled to an AC power source, a large amount of voltage developed across the DC bus line (i.e, across the capacitor 224) during a period of motor coasting depending on the amount of load and operation conditions of the tool. This is true both in long periods of motor coasting and during soft-braking, where coasting periods follow braking periods within each braking cycle.

FIG. 18 depicts a waveform diagram of the bus voltage, as well as the UH, VH, WH, UL, VL, WL voltage signals, for a drive circuit as the circuit diagram of FIG. 9. As shown in this figure, the voltage across the DC bus line is at a nominal level of approximately 160-170V during a period of hard braking (or during normal motor commutation), which approximately corresponds to the peak voltage of the AC power supply. However, this voltage spikes rapidly to approximately 230V during the execution of soft braking and/or during a coasting period of the motor 28. This voltage spike may be damaging to switching and motor components.

According to an embodiment, normal motor commutation allows the voltage on the DC bus line to supply a driving force to the motor and thus brings the DC bus voltage back down to its nominal level. Thus, according to an embodiment of the invention, the control unit 208 is configured to monitor the voltage across the DC bus line (i.e., across the capacitor 224, via, for example, the power lines coupled to power supply regulator 234 in FIG. 9). If the voltage across the DC bus line is found to be above a predetermined threshold (e.g., 220V), particularly while motor is coasting or during a coasting period of a soft brake cycle, the control unit 208 is configured to enter a "weak motoring" period. FIG. 19 depicts an exemplary commutation cycle during "weak motoring." During this period, the control unit 208 performs normal motor commutation at a relatively low duty cycle. The duty cycle may depend on the rotational speed of the motor. For example, the duty cycle may be set to 50% at high speed (e.g., over 20,000 rpm), to 25% at mid speed (e.g., between 10,000 to 20,000 rpm), and to 12% at low speed (e.g., under 10,000 rpm). In this manner, the control unit 208 directs the voltage on the DC bus line to drive the motor 28 for a small period of time, in this case 2 milliseconds. While driving the motor within this time speeds up the motor slightly, it allows the DC bus voltage to come down to its nominal level. In an embodiment, the control unit 208 may then once again allow the motor to coast or soft brake.

FIG. 20 depicts an exemplary process executed by control unit 208, according to an embodiment. In this process, which starts at 500, the control unit 208 executed motor coasting at 502, whereby the control unit 208 deactivates all motor switches. This may be done independently of a braking process, or as a part of "soft brake" execution. The motor then monitors the voltage on the DC bus line at 504, and compares the DC bus voltage to an upper threshold value of, e.g., 220V. If the DC bus voltage does not exceed the threshold, the control unit continues motor coasting at 502. However, if the DC bus voltage exceeds the threshold, the control unit 208 initiates "weak motoring," where it sets a weak motoring duty cycle in accordance with the current rotational speed of the motor at 508, and begins execution of weak motoring according to the duty cycle at 510. This continues until the voltage on the DC bus line reaches a lower threshold at 512. Once the DC bus voltages falls below the lower threshold, the process returns to execution of motor coasting and/or soft braking at 502.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The invention claimed is:

1. A power tool comprising:
a housing;
a brushless direct-current (BLDC) electric motor disposed inside the housing, the electric motor including a rotor having one or more magnets and a stator including a plurality of windings;
a plurality of power switches disposed between a power supply and the electric motor, the plurality of power switches including a plurality of high-side switches and a plurality of low-side switches; and
a control unit configured to control a switching operation of the plurality of power switches to operate the electric motor and electronically brake the motor by simultaneously activating the plurality of the high-side switches or the plurality of low-side switches to apply a back-EMF (electro-magnetic force) current of the motor to the plurality of windings and thereby stop the rotation of the motor upon detection of a condition prompting the braking of the motor,
wherein the control unit is configured to: detect the condition that prompts the braking of the electric motor, set a braking profile for braking the electric motor based on the detected condition, and execute braking of the electric motor using the braking profile, and
wherein the braking profile is executed over a plurality of braking cycles of the same time-length and comprises a first braking segment during which a first braking force is applied to brake the motor by supplying a first amount of motor back-EMF current to the plurality of stator windings, followed by a second braking segment during which a second braking force different from the first braking force is applied to brake the motor by supplying a second amount of motor back-EMF current to the plurality of stator windings, wherein the first amount of motor back-EMF current per braking cycle is different from the second amount of back-EMF current per braking cycle.

2. The power tool of claim 1, wherein the control unit executed hard braking to apply the first braking force to the motor during the first braking segment, and executes soft braking to apply the second braking force to the motor during the second braking segment, wherein the second braking force is less than the first braking force.

3. The power tool of claim 2, wherein the control unit is configured to monitor a rotational speed of the motor and switch from the first braking segment to the second braking segment when the rotational speed of the motor falls below a predetermined threshold speed.

4. The power tool of claim 1, wherein the control unit executed soft braking to apply the first braking force to the motor during the first braking segment, and executes hard braking to apply the second braking force to the motor during the second braking segment, wherein the first braking force is less than the second braking force.

5. A power tool comprising:
a housing;
a brushless direct-current (BLDC) electric motor disposed inside the housing, the electric motor including a rotor having one or more magnets and a stator including a plurality of windings;
a plurality of power switches disposed between a power supply and the electric motor, the plurality of power switches including a plurality of high-side switches and a plurality of low-side switches; and
a control unit configured to control a switching operation of the plurality of power switches to operate the electric motor and electronically brake the motor by simultaneously activating the plurality of the high-side switches or the plurality of low-side switches to apply a back-EMF (electro-magnetic force) current of the motor to the plurality of windings and thereby stop the rotation of the motor upon detection of a condition prompting the braking of the motor,
wherein the control unit is configured to electronically brake the motor over a plurality of braking cycles of the same time-length by executing a hard braking segment during which a first braking force is applied to brake the motor by supplying a first amount of motor back-EMF current to the plurality of stator windings, followed by a soft braking segment during which a second braking force is applied to brake the motor by supplying a second amount of motor back-EMF current to the plurality of stator windings, wherein the first braking force is greater than the second braking force and the first amount of motor back-EMF current per braking cycle is greater than the second amount of back-EMF current per braking cycle.

6. The power tool of claim 5, wherein when executing soft braking, during a braking cycle, the control unit activates the three high-side switches or the three low-side switches simultaneously during a braking period, and deactivates all the plurality of power switches during a coasting period following the braking period.

* * * * *